Aug. 23, 1949.  C. B. BLESSING  2,479,552
GARMENT PACKAGING DEVICE
Filed May 10, 1949  12 Sheets-Sheet 1
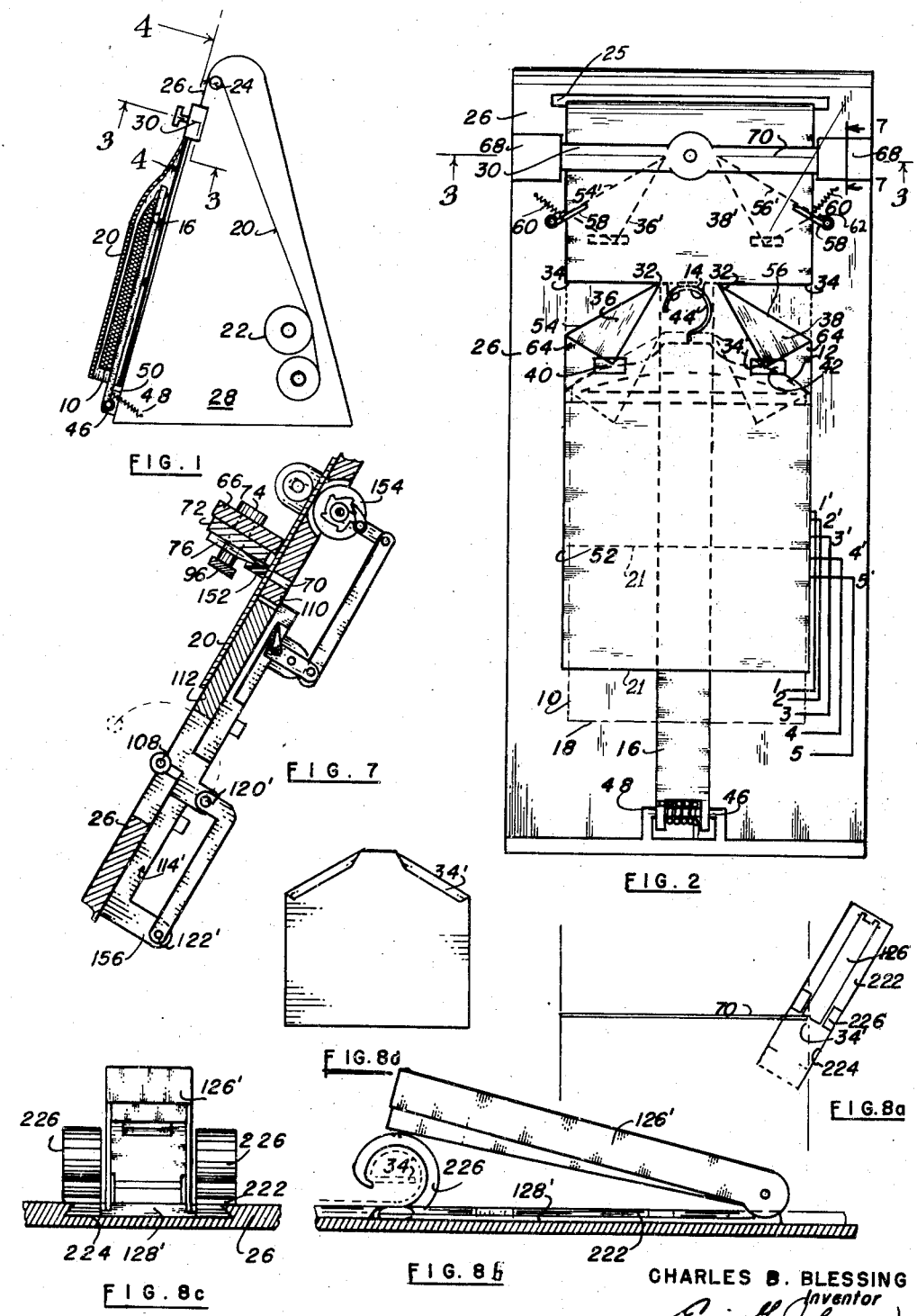
CHARLES B. BLESSING
Inventor
Emmi G. Johnson
Attorney Aug. 23, 1949.  C. B. BLESSING  2,479,552
GARMENT PACKAGING DEVICE
Filed May 10, 1949  12 Sheets-Sheet 2
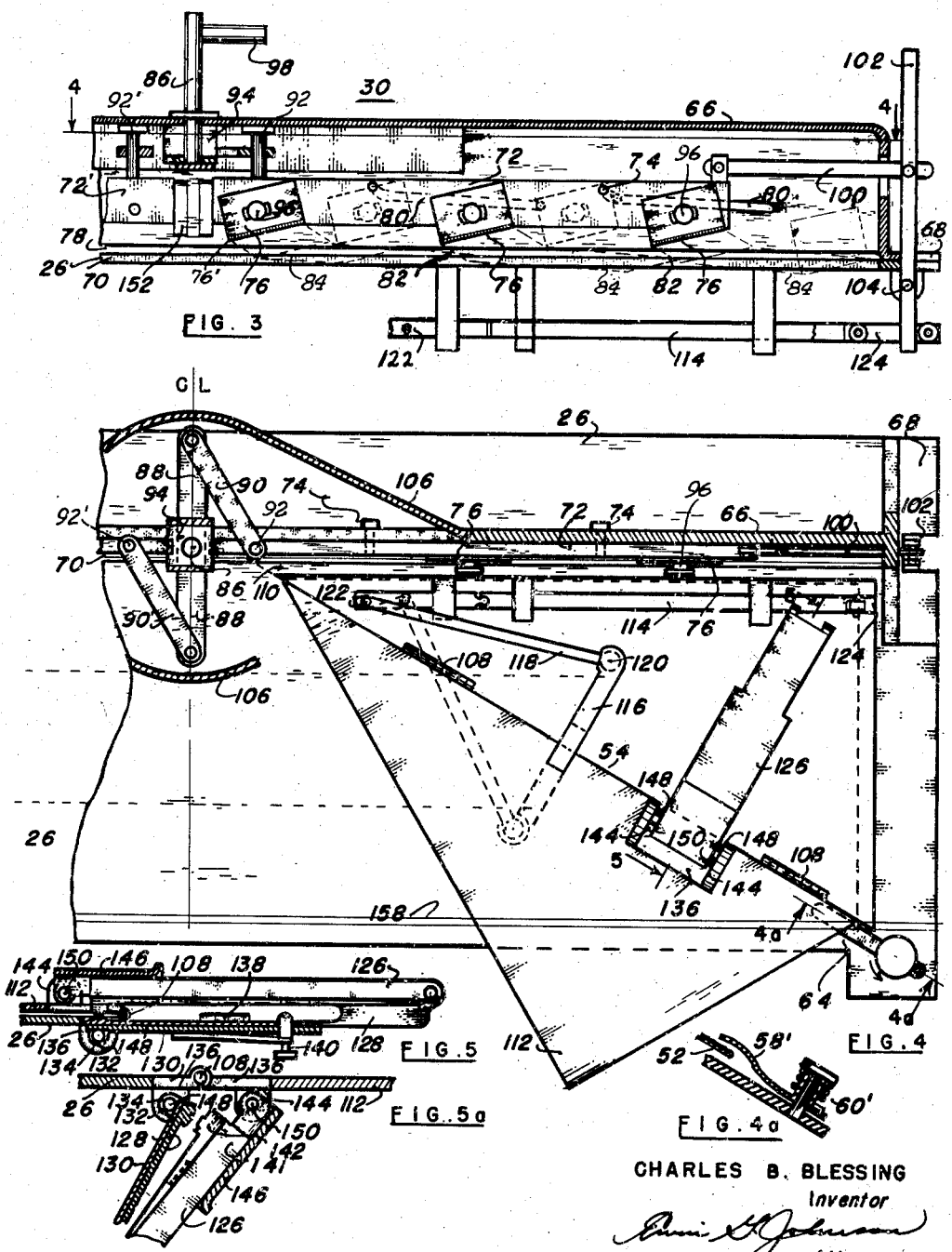
CHARLES B. BLESSING
Inventor
Attorney Aug. 23, 1949.     C. B. BLESSING     2,479,552
GARMENT PACKAGING DEVICE
Filed May 10, 1949     12 Sheets-Sheet 3

CHARLES B. BLESSING
*Inventor*
*Attorney*

Aug. 23, 1949.  C. B. BLESSING  2,479,552
GARMENT PACKAGING DEVICE
Filed May 10, 1949  12 Sheets-Sheet 4

Charles B. Blessing
Inventor
By Rivis G. Johnson
Attorney

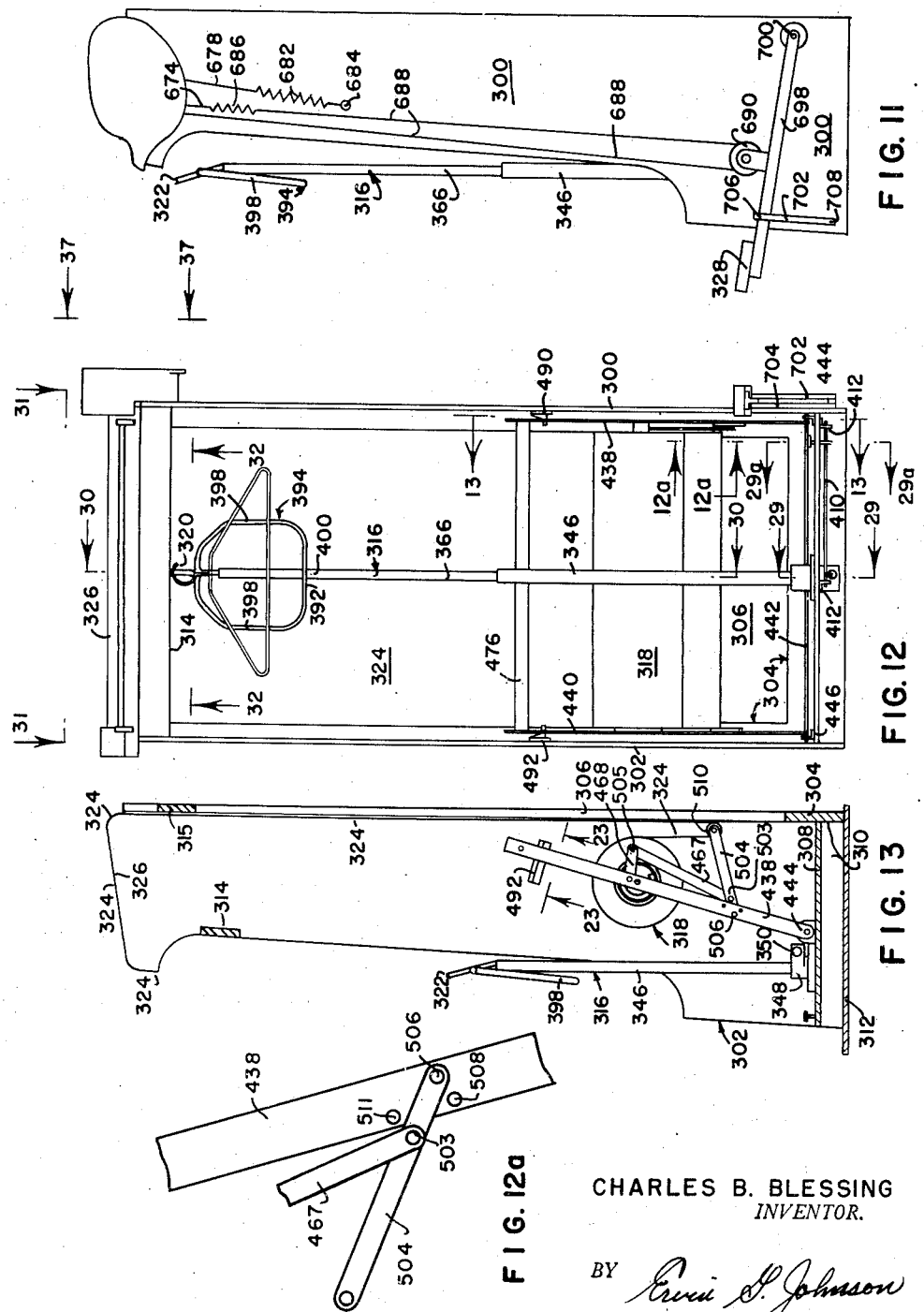

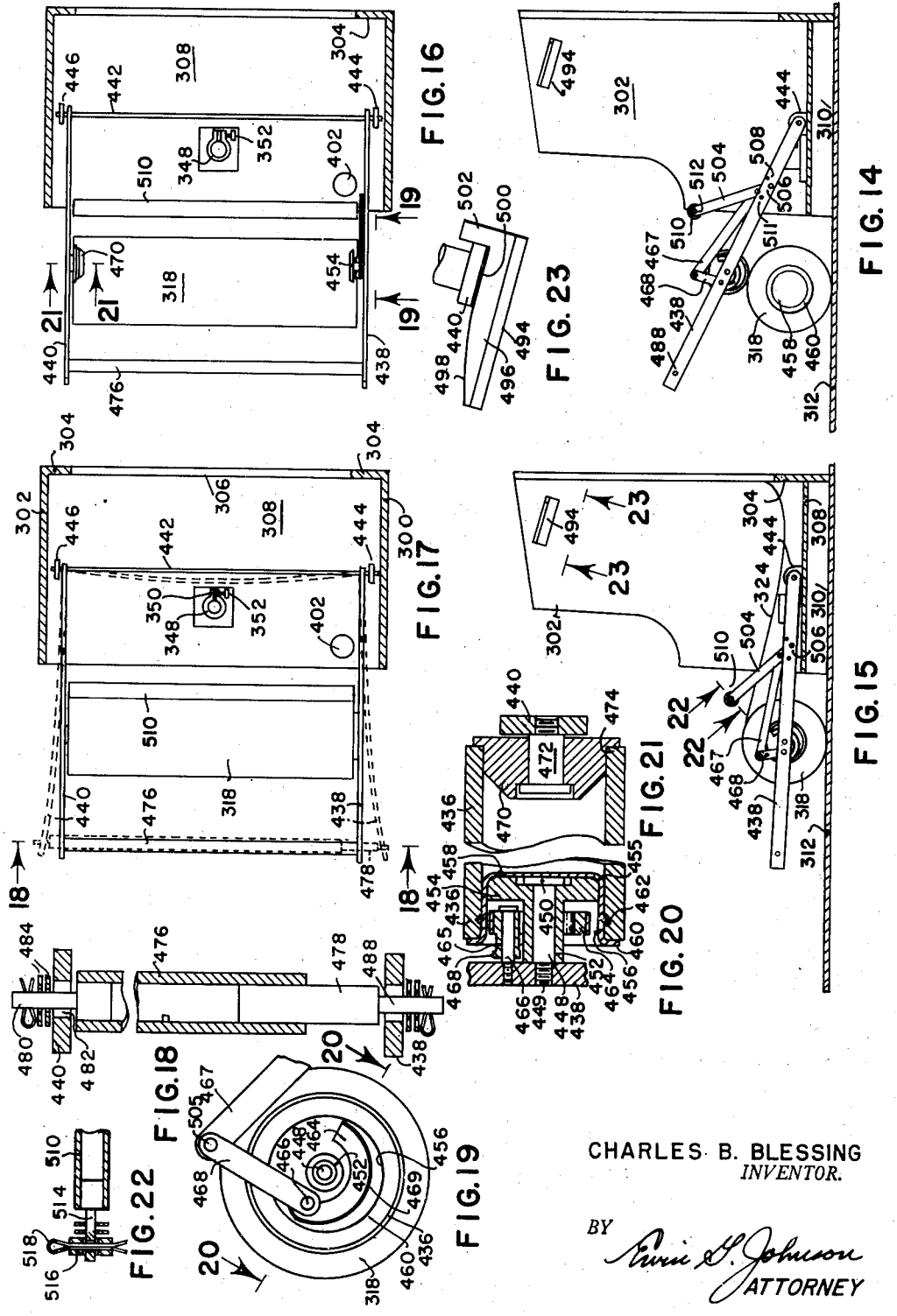

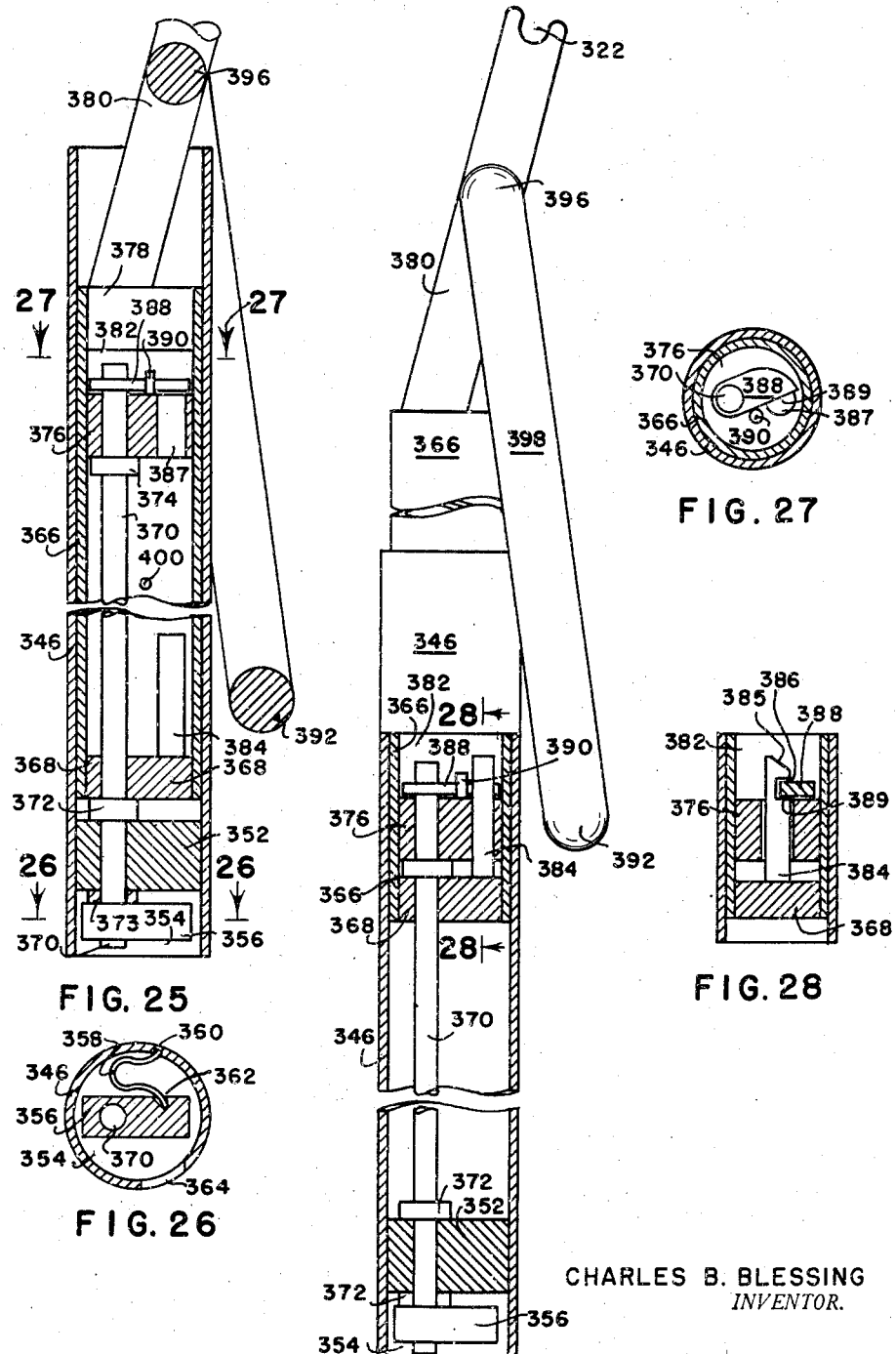

Aug. 23, 1949.　　　　　C. B. BLESSING　　　　　2,479,552
GARMENT PACKAGING DEVICE
Filed May 10, 1949　　　　　　　　　　　　　　　12 Sheets-Sheet 8
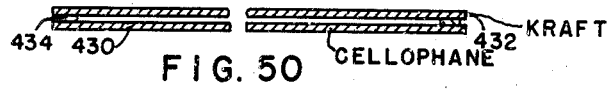
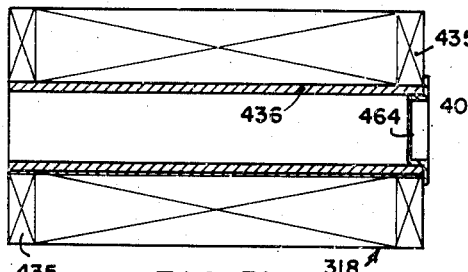
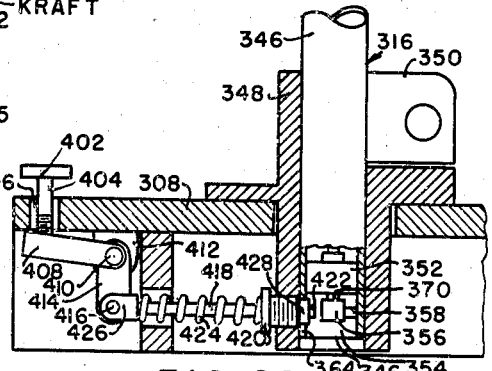
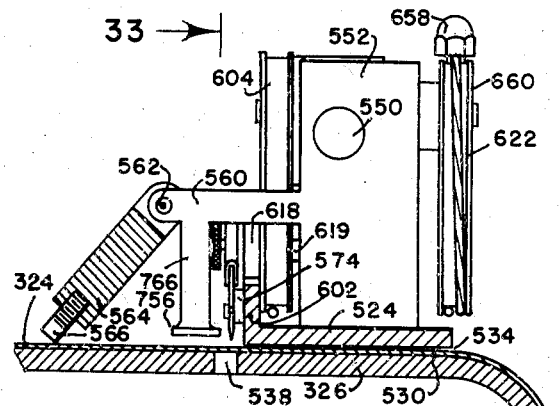
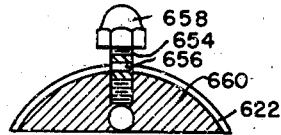
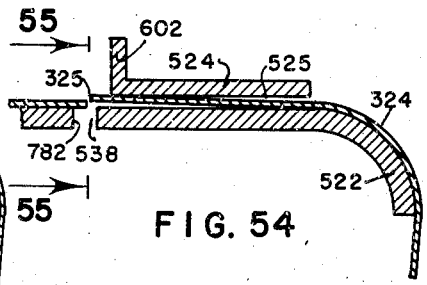
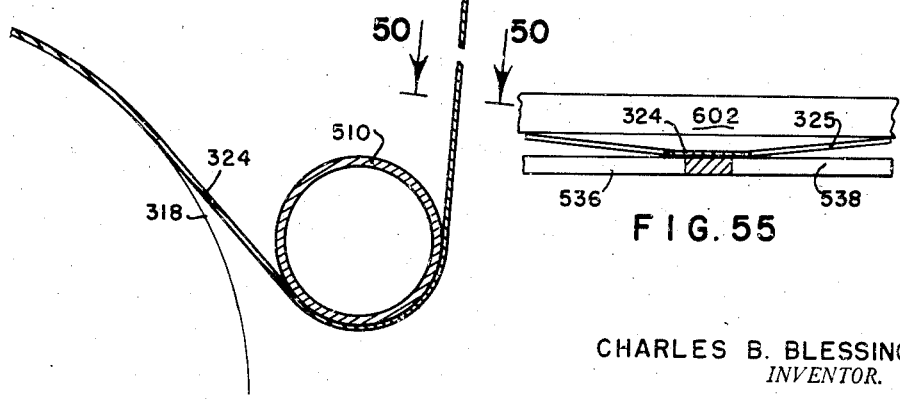
CHARLES B. BLESSING
*INVENTOR.*
BY　*Ervin J. Johnson*
　　　　*ATTORNEY*

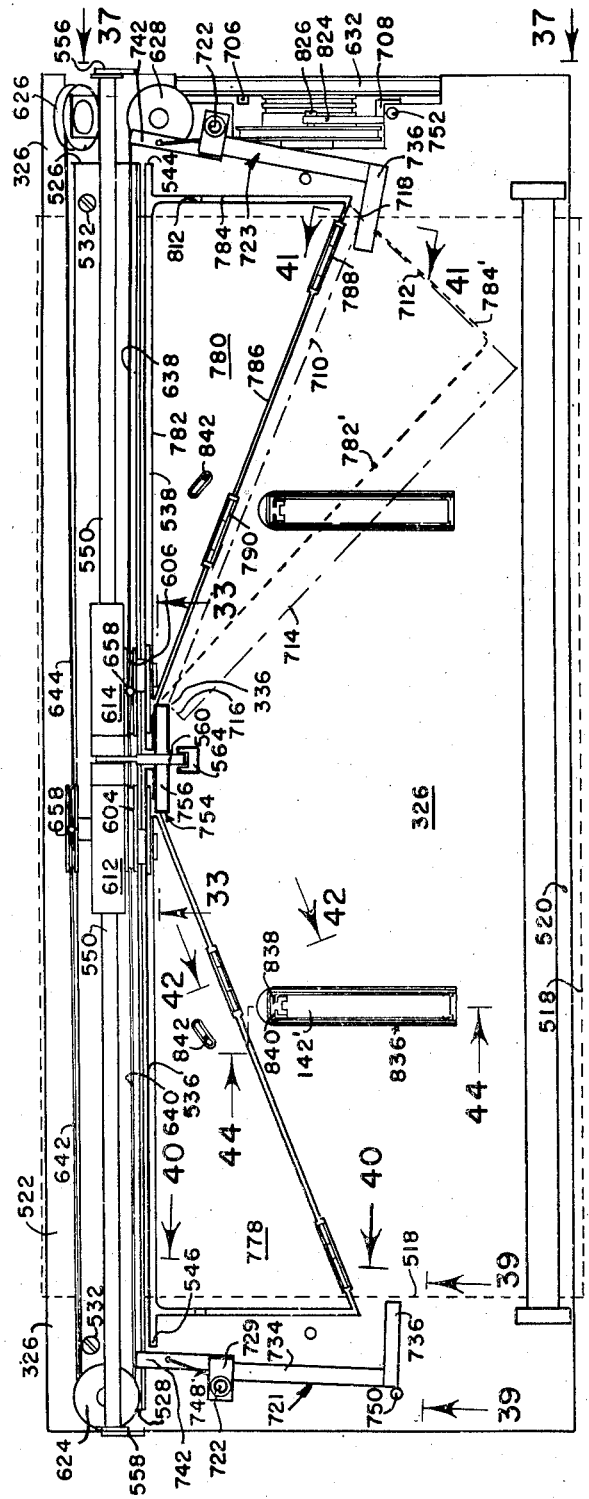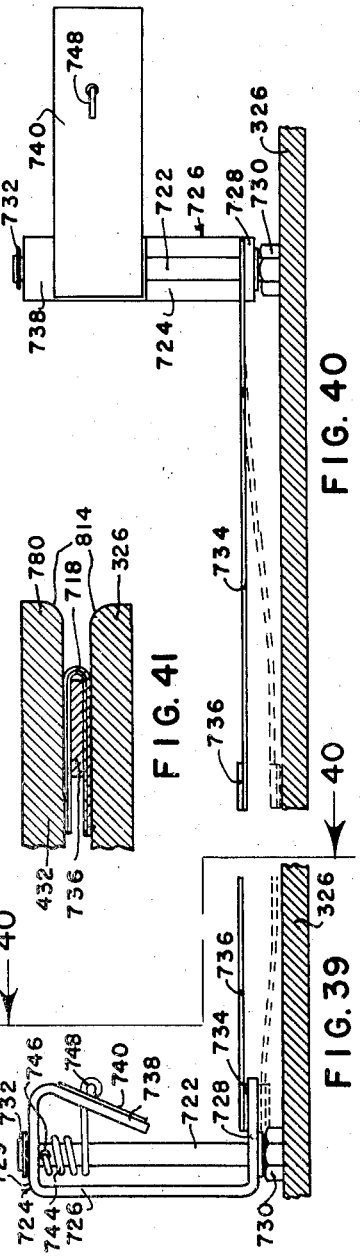

Aug. 23, 1949.  C. B. BLESSING  2,479,552
GARMENT PACKAGING DEVICE
Filed May 10, 1949  12 Sheets-Sheet 10
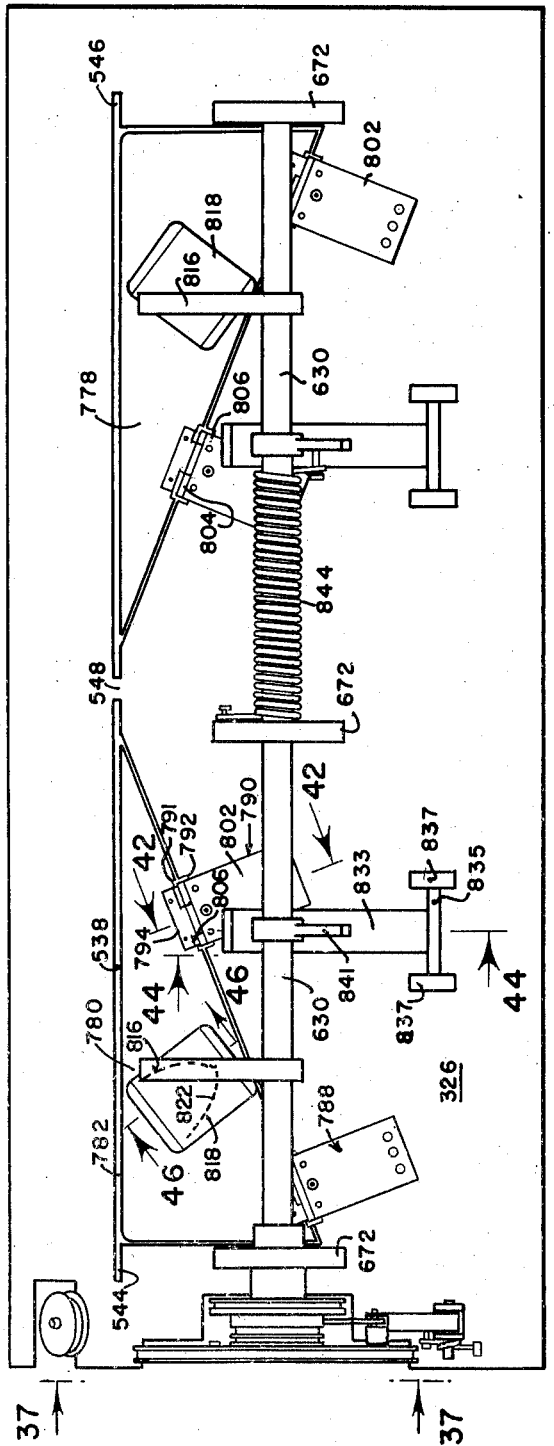
CHARLES B. BLESSING
*INVENTOR.*
BY
*ATTORNEY*

Aug. 23, 1949.　　　　C. B. BLESSING　　　　2,479,552
GARMENT PACKAGING DEVICE
Filed May 10, 1949　　　　　　　　　　　　　12 Sheets-Sheet 11
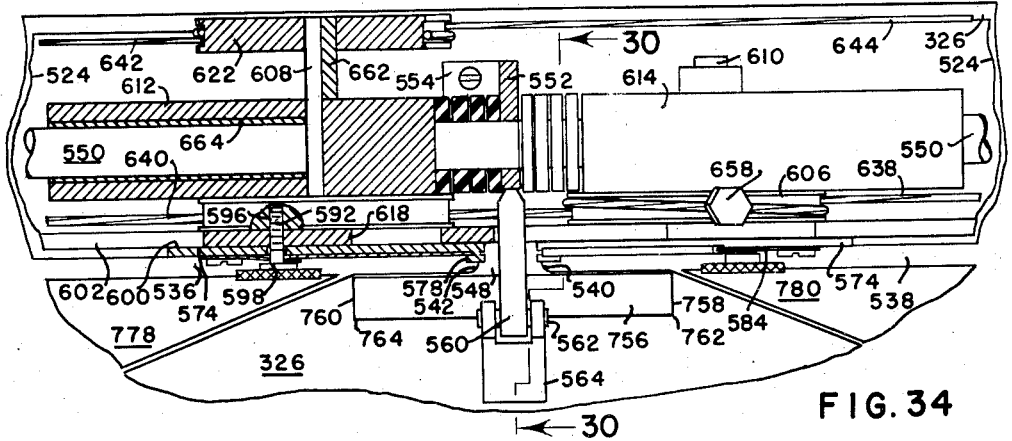
FIG. 34
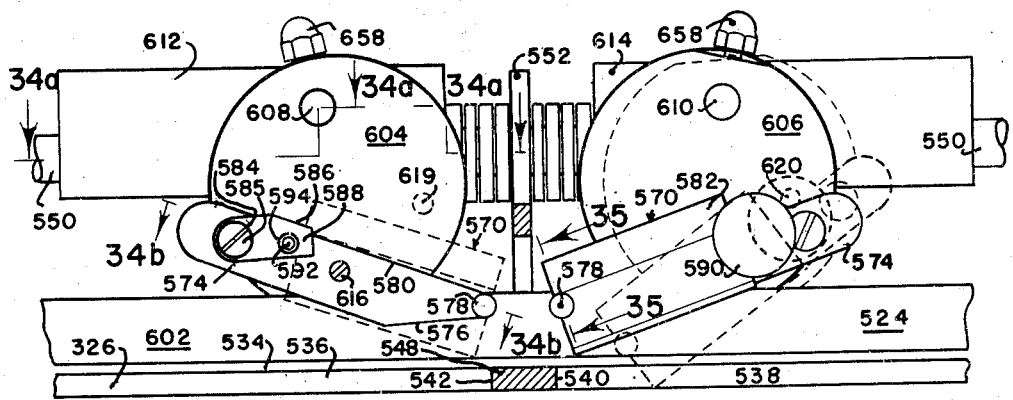
FIG. 33
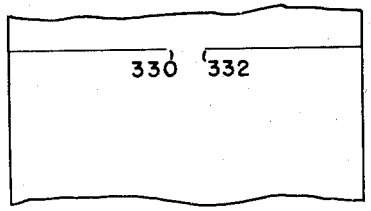
FIG. 49
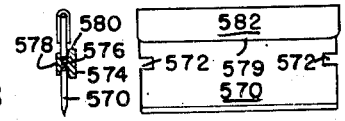
FIG. 48
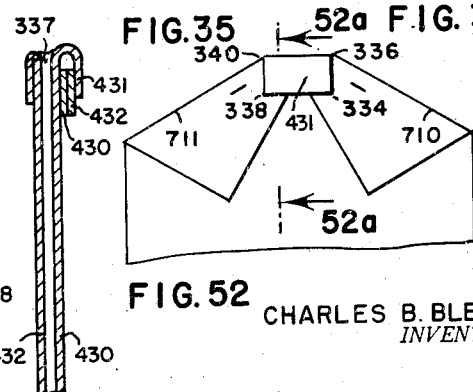
FIG. 35　FIG. 36
FIG. 52
FIG. 52a
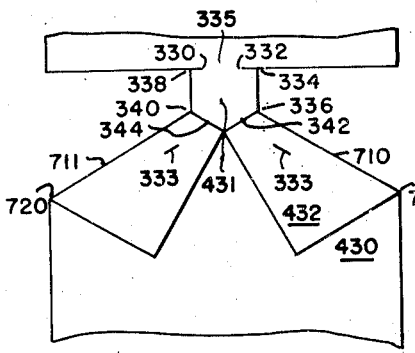
CHARLES B. BLESSING
INVENTOR.
BY
*Ernie H. Johnson*
ATTORNEY

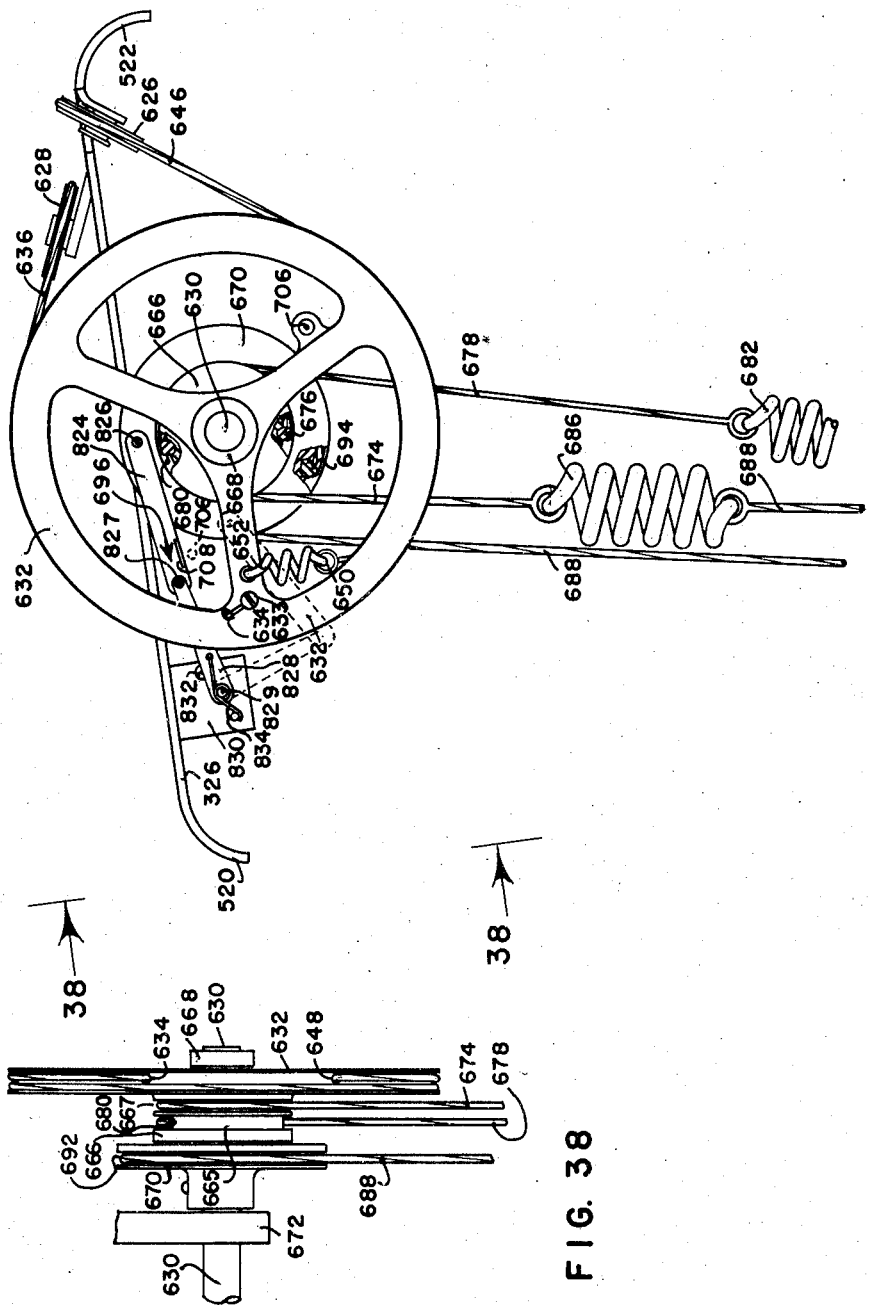

Patented Aug. 23, 1949

2,479,552

UNITED STATES PATENT OFFICE 2,479,552

GARMENT PACKAGING DEVICE

Charles B. Blessing, Oakland, Calif., assignor to Blessing Packaging Company, a corporation of California Application May 10, 1949, Serial No. 92,259

29 Claims. (Cl. 93—2)

This is a continuation-in-part of application Serial No. 654,400, filed March 14, 1946, now abandoned, which was a continuation-in-part of application Serial No. 352,897, filed August 16, 1940, also abandoned; this application also includes subject matter from my application Serial No. 15,869, filed March 19, 1948.

This invention provides for the placing and fabrication of a covering over a garment supported upon a suitable hanger, such as a cleaned garment, particularly as regards garments returned by cleaning establishments. This invention further provides a novel method of making a bag in the cleaning establishment itself, fitting the bag to the length of the garment. The invention further relates to various unique mechanisms for accomplishing the major objectives.

In the drawings:

Figure 1 is a schematic view of a machine embodying my invention.

Figure 2 is a front view of the machine shown in Figure 1, illustrating the machine in further detail.

Figure 3 is a fragmentary view partly in section of one embodiment of a cutting mechanism and a folding and a stapling mechanism actuator.

Figure 4 is a fragmentary sectional plan view of the cutting and stapling mechanism along lines 4—4 in Figures 3 and 6.

Figure 4a is a section at line 4a—4a of Figure 4.

Figure 5 is a detail of the stapling machine in operated position.

Figure 5a is a fragmentary view of the stapling mechanism in retracted position, the folding mechanism also being shown in retracted position.

Figure 6:
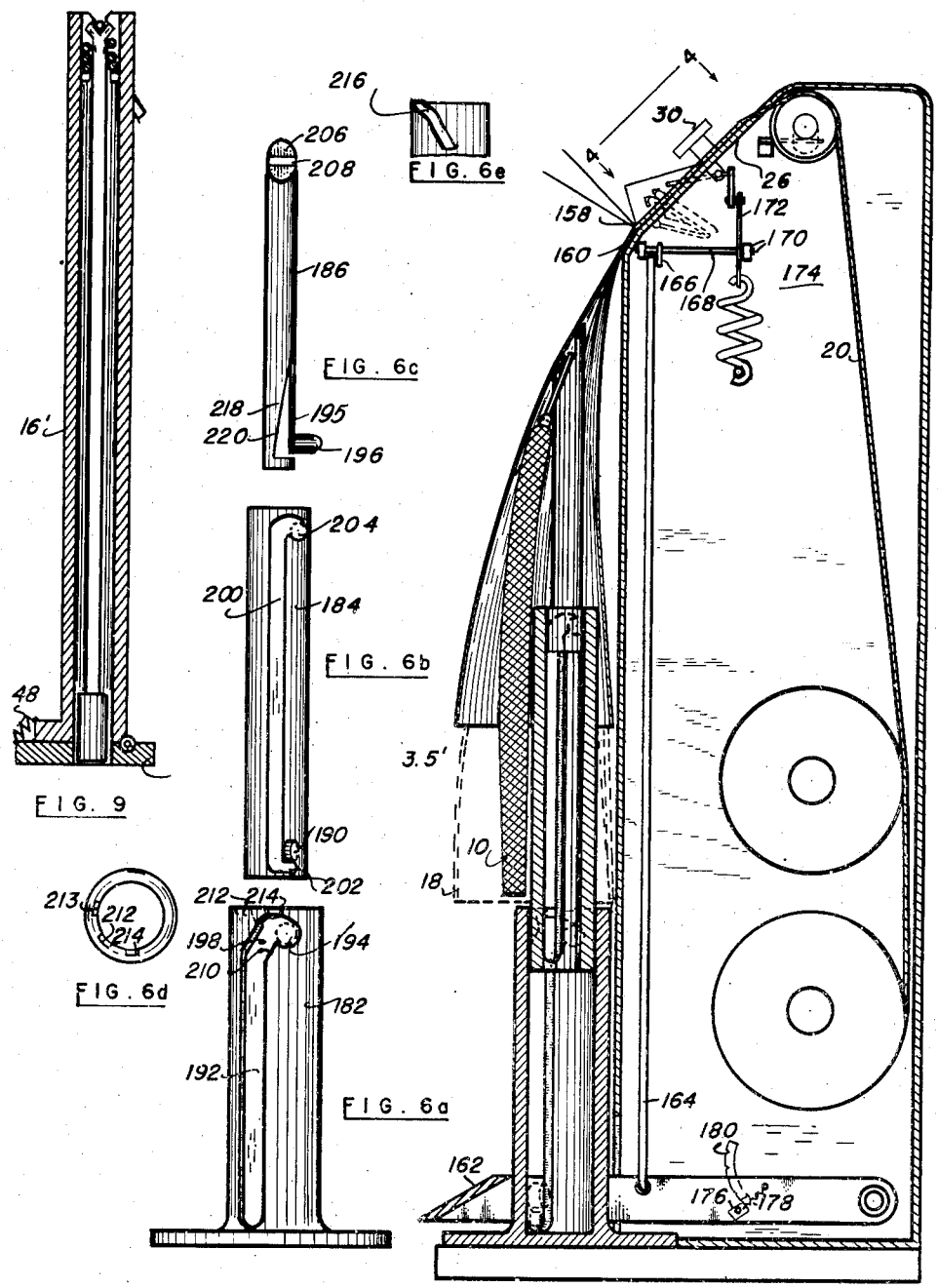
Figure 6 is a side elevation showing a modified embodiment of the clothes hanger support and fold line control.

Figures 6a, 6b, 6c, 6d, and 6e show parts of the collapsible hanger support of Figure 6.

Figure 7 illustrates a modified mechanism for feeding paper, cutting, holding the center for folding, and actuating the folding and stapling mechanism.

Figures 8a, 8b, 8c, and 8d show a further modification of the mechanism for folding and fastening a cover about a supported garment.

Figure 9 illustrates another form of collapsible garment hanger support.

Figure 10:
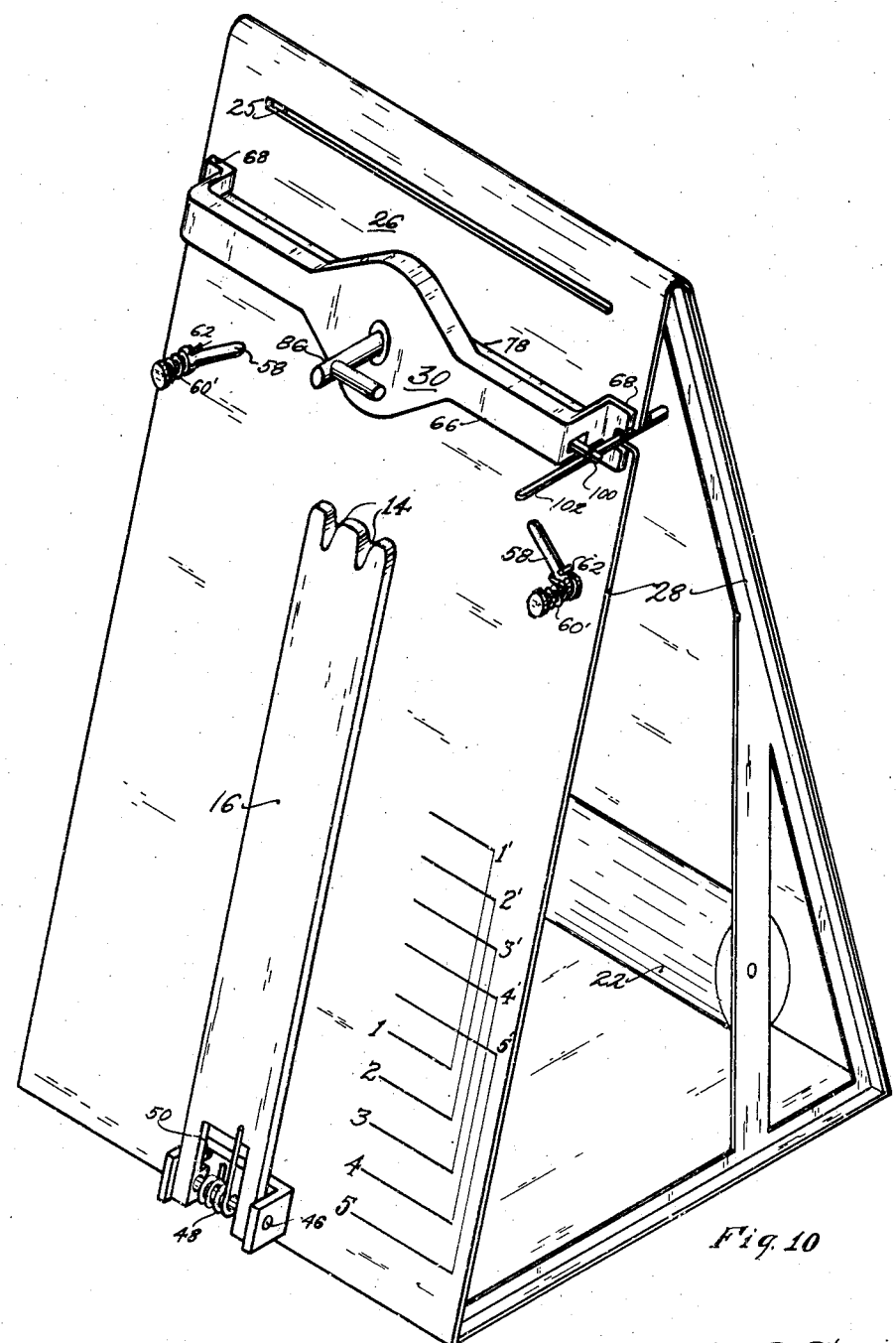

Figure 10 is a perspective view of a complete form of the machine.

Figure 11 is a side elevation of another form of the machine.

Figure 12 is a front view of the machine shown in Figure 11.

Figure 12a is a fragmentary view of details as seen from plane 12a—12a in Figure 12.

Figure 13 is a section taken along line 13—13 in Figure 12.

Figures 14 and 15 are partial sections illustrating various positions of the mechanisms shown in Figure 13.

Figures 16 and 17 are fragmentary plan views of the mechanisms shown respectively in Figures 14 and 15 and illustrating successive steps in placing a roll of paper in position for use in the machine.

Figure 18 is a section along line 18—18 in Figure 17.

Figure 19 is a section taken along line 19—19 in Figure 16, part 438 being omitted.

Figure 20 is section along line 20—20 in Figure 19.

Figure 21 is a section taken along line 21—21 in Figure 16.

Figure 22 is a section taken along line 22—22 in Figure 15.

Figure 23 is a section taken along line 23—23 in Figures 13 and 15.

Figure 24 is an elevation, partly in section, of the telescoping support in extended position.

Figure 25 is a view, generally similar to that of Figure 24, but with the telescoping elements in collapsed position as viewed in Figure 13.

Figure 26 is a section along line 26—26 in Figure 25.

Figure 27 is a section along line 27—27 in Figure 25.

Figure 28 is a section along line 28—28 in Figure 24.

Figure 29 is in part a section along line 29—29 and in part a section along line 29a—29a in Figure 12 and showing the release for the garment support.

Figure 30 is a fragmentary section along line 30—30 in Figures 12 and 34.

Figure 31 is an enlarged view of certain portions of the bag forming mechanism as seen from approximately plane 31—31 in Figure 12, certain details of which have been omitted from Figures 11, 12 and 13.

Figure 32 is a view of certain other portions of the bag forming mechanism as seen from approximately plane 32—32 in Figure 12 and corresponding to a bottom view of the mechanism shown in Figure 31.

Figure 33 is an enlarged fragmentary section along line 33—33 in Figures 30 and 31.

Figure 34 is a section along lines 34a—34a and 34b—34b of Figure 33.

Figure 35 is a fragmentary section along line 35—35 in Figure 33.

Figure 36 is a side elevation of a cutter blade.

Figure 37 is an enlarged fragmentary view along line 37—37 in Figures 12, 31 and 32.

Figure 38 is a partial view as seen from plane 38—38 in Figure 37.

Figure 39 is an enlarged fragmentary view from plane 39—39 in Figure 31.

Figure 40 is an enlarged fragmentary view from plane 40—40 in Figure 31.

Figure 41 is an enlarged fragmentary section illustrating an operation occurring at about plane 41—41 in Figure 31.

Figure 42 is an enlarged section along line 42—42 in Figures 31 and 32.

Figure 43 is a view like that in Figure 42 with the parts in operated position.

Figure 44 is a section along line 44—44 in Figures 31 and 32.

Figure 45 is a view similar to that in Figure 44 but with the parts in operated position.

Figure 46 is a fragmentary section along lines 46—46 in Figure 32, the parts shown by broken lines being in an operated position.

Figure 47 is a fragmentary view from plane 47—47 of Figure 46.

Figures 48, 49, 52 and 52a illustrate steps in the formation of a bag.

Figure 50 is a section along line 50—50 in Figure 30.

Figure 51 is a section through a support for a roll of the tubular stock from which the bags are made, the roll being shown schematically.

Figure 53 is a fragmentary section showing a detail of the cable anchor.

Figure 54 is a section illustrating the position of the paper immediately following the cutting in relation to some of the cutting mechanism.

Figure 55 is a section along line 55—55 in Figure 54.

In that embodiment of the invention which is shown in Figures 1 and 2, the garment 10 on hanger 12 hooked on a recess 14 in the upper end of an inclined post 16 hangs to a point 18 opposite a point between graduations 3 and 4. A tube of paper 20 is drawn from a roll of tubular paper stock 22 and over an upper guide roll 24 out through slot 25 onto the face 26 of frame 28 so that its lower open end 21 stops at a point between graduations 3' and 4', and envelopes the garment, hanger, and post 16, as indicated in Figures 2 and 6, fully covering the garment, and having passed under the cutter 30 for cutting from 32 to 34.

The paper is then cut from 32 to 34 in each direction from center and the corners 36 and 38 are turned inward and fastened as at 40 and 42 by adhesive tape, thus forming a tapered shouldered bag, the same remaining in bond with the supply of stock from 32 to 32. By pulling the paper at the midline the stock is pulled from under the knife 30 and to the full line position of Figure 2. The portion of paper from 32 to 32 is now cut off, leaving the stock ready for the next bag and garment. The completed bag is now pulled fully down over the garment as indicated at 18 in Figures 2 and 6.

To remove the garment the operator grasps the upper end of the post 16 and the hanger hook 44, tilts the post and garment forwardly and slips the garment, hanger, and bag, endwise away from the pivot 46. A suitable spring 48 returns the post to stop 50 which spaces the post from the face 26 of the frame 28.

The bag 52 so made can be slipped from the garment downwardly when in the customer's closet, it being necessary only to break the tapes 40 and 42. The corners 38 do not dog-ear.

The distances between the graduations 1 and 1', and between the graduations 2 and 2', and so on in Figure 2, represent the distance between the top of the hanger 12 and the cutter 30 so that when the finished bag is pulled down it will cover the garment to the correct length, avoiding an oversupply of covering and also avoiding a shortage of covering.

Fold lines 54 and 56 are defined, in this modification, by the points 32 and the break may be effected over pivoted barriers 58 biased to lines 54' and 56' by springs 60 against stops 62. When the fold has been effected the barrier members are removed from their position within the fold by rotation inwardly, downwardly, and outwardly to slip out of the notches 64 incident to downward pull on the bag 52 to position of Figure 2.

Member 16 and the spring 48 are preferably of light weight and comparatively weak action respectively in order to protect the bag against tearing in the event the operator lifts the hanger out of 14 and pulls the post 16 against the bag, in which event the post will simply deflect forwardly and allow the bag to slide off the same. The inclination of the post 16 is to provide for keeping the post in stable position even though several suits or other garments are hung thereon, leaving the center of gravity of the post and its load rightward of the pivot 46 as viewed in Figure 1. A plurality of rolls of tubular paper 22 are provided simply to render the machine a storage point for a reserve supply of the tubular stock.

While the cutting may be effected by many desirable types of cutting devices, the preferred embodiment of cutting device 30 as illustrated in Figures 1, 2, 3, 4 and 10, is carried by a frame 66 attached by feet 68 to plate 26 at opposite ends of blade-groove, or slit, 70. A blade carrier 72 is movable to the right in Figure 3 and down toward the slit 70 and along it, to carry the cutting blades 76 through the paper which lies through the passage 78 between the frame 66 and the face plate 26. Pins 74 fastened in blade carrier 72 pass through cam slots 80 in the frame 66. Movement of the carrier 72 to the right in Figure 3 causes the blade tips 76' to move rapidly down along a path indicated by the dotted lines 82, and then in a slightly inclined direction along the lines 84 to cut the stock from 32 to 34 as shown in Figure 2. The carriage and movement of a second blade carrier 72' is like that of carrier 72 except that it moves to the left in Figure 2 to cut the paper from 32 to 34, as at the left side of the stock in Figure 2. The advantage of moving in opposite directions from the center is that there is no tendency to wrinkle the stock. The advance of the blade into the stock while point 76' follows path 84 insures that all points along the blade cut paper thus distributing the wear on the cutting edge. Several blades are used so that each needs to move only slightly more than its own length, reducing the swing of operating members. Reciprocation of the blade carriers in opposite directions may be accomplished at a single operation by central crank pin 86 around the axis of which rotate the crank arms 88 to the ends of which are linked the links 90 and 90' freely rotating on pins 92 and 92' carried by the blade carriers 72 and 72'. Rotation of 88 causes the movement of the carriers in opposite directions. Pin 86 finds bearing support in the frame 66 and a supporting bracket 94 carried by the frame, as shown in Figures 3 and 4. Blades 76 are removably secured to the carrier by thumbnuts 96.

The movement of the blade carriers may be effected by fastening pin 86 to arm 88 and connecting the pin 86 to a lever 98 for rotation to effect cutting. This action may, however, be effected from the end of the cutter by a link 100 pivoted to the carrier 72 and to a lever 102 pivoted at 104. This lever when actuated will cause movement of the blade carriers in opposite directions. The arms 88 are enclosed by a housing bracket 106.

The folding operation is preferably effected mechanically; in that form of device particularly shown in Figures 3 and 4, this is achieved by mounting a triangular portion 112 of the plate providing face 26 on hinges 108 on each side of the frame so that it provides a flap. The upper end of each flap 112 abuts a strip 110 adjacent the cutting groove 70. The operation of the flap 112 is effected from the lever 102 through a transversely sliding link 114. A bracket 116 is secured to the flap 112 and joined to the reciprocating member 114 by a pitman 118 and universal joints 120 and 122 whereby reciprocating movement of the slide member 114 produces rotation of the flap from the dotted line position in Figure 4 to the full line position of Figure 4 to cause a fold in the stock along the line 54. A lost motion linkage at 124 provides that the flap 112 is operated only after the blades have cut the paper. Slots 80 permit over travel of the blades after cutting to permit the folding operation. Retraction of the blades is effected before the flaps 112 return to their position flush with the plate 26. The fold-line terminus at 64 is assured by the bowed leaf spring 58', which permits the stock 52 to slide thereunder incident to feeding the stock and which is flattened by the plate, offering no considerable resistance. A spiral spring 60' locates and relocates the member 58' at the desired radius.

It is desired to fasten the fold near the fold line 54, and this may be done with a conventional stapler 126 having its anvil portion 128 secured to the plate 26 as by means of a plate 130 having trunnion ears 132 and pivoted to lugs 134 on opposite sides of a recess 136 adjacent the pivot line in the plate 26, said lugs 134 being secured to the plate 26 and providing for the pivoting of the plate 130 parallel to axis of hinges 108 on pivot 148. Plate 130 includes hooks 138 which, with the plate 26, serve to retain the anvil portion 128 in position. A spring latch 140 passes through both the plate 130 and the anvil 128.

The movable portions of the stapler 141 and 142, respectively carrying the pusher and the magazine portions of the stapler, are detachably secured to the flap 112 by trunnion ears 144 and adapter 146 rigidly secured to member 141 and pivoted to said ears 144 by a pin 150 parallel to axis of 108. A recess 136' is provided in flap 112 for the passage therethrough of staples and the stapling head 142. The pivot pins 148 and 150 are so spaced as to ensure that, when the stapler is in fastening position, the staple is caused to engage and pass through the paper near the fold made therein as an incident to the folding operation, as illustrated in Figure 5. The pivots are spread apart for retraction of the staple ejector in the position flush with plate 26 as illustrated in Figure 5a. The stapler 126 is of such size or so located that it can pass through the opening formed by the folding movement of the flap 112. With the plate 26 in an inclined position the folding and stapling action of the flap 112 is accelerated by gravity, the longer leverage of the plate 112 adding thereto.

By modifying the construction the paper may be entirely cut from the center line CL. The blades 76 are positioned to effect a cut entirely across the stock. Resilient rubber hold-down strips 152 are carried by the carrier bars 72 and 72' and engage the cut-off portion of paper to the points 32, as shown in Figures 3 and 7. After the flaps 112 are returned to starting position, the paper is fed past the knife position by feed mechanism 154 of conventional design carried above the knife position as illustrated in Figure 7 wherein the stock is illustrated as fed over the flap 112.

As illustrated in Figure 7, the flap may be actuated by a slider 114' sliding along the edge of the plate 26 and connected by suitable linkage to actuate a pawl arrangement to operate mechanism 154 so that the final movement of the slider feeds the paper sufficiently far so that the operator can engage the same to pull it over the post 16. The timing is such that the flap 112 returns to full line position of Figure 7 before the stock feeds to the upper edge thereof, and such that the rubber hold-down strips 152 are retracted before the stock feed reaches their position so that the stock clears all operating mechanism.

In the modification of Figure 6 the barriers are dispensed with and the same result is obtained by forming the plate 26 with a ridge thereacross at 158 to intersect at the lower fold terminus 64 as indicated in Figures 2 and 4. The paper stock is pulled down over this angle and offers sufficient resistance to deformation on the surface 160 therebelow to prevent the paper from rolling beyond the ridge, while the upper corners 32 are held as in Figure 2 or by the hold-downs 152. The barriers 58' and 58 are thereby dispensed with.

As illustrated in Figure 6 the cutting, folding and fastening may be entirely effected from a foot lever 162 through a pitman 164 and suitable bell cranks 166 and 172 carried by shaft 168 mounted in trunnions 170 on the frame 174 and suitably connected to actuate lever 102 and slider 114 in Figure 3 or connected to actuate lever 102 in Figure 3 and slider 114' in Figure 7. The foot lever 162 is preferably insured a full stroke by a full stroke pawl 176 biased by spring 178 and sliding on stationary notched arc 180 over the extent of which it must slide before being permitted a reversal.

In order to prevent the tearing of bags by the negligent operator an improved form of post is provided and shown in Figure 6 to comprise telescoping members 182, 184 and 186. The stationary telescoping member 182 is fixed to the base 188 of the supporting structure 174 and is provided with a generally vertically disposed slot 192 for the reception therethrough of a pin 190 and a pin 196 on the telescoping member 184 and 186 respectively. Slot 192 terminates in a ledge 194 adapted to receive and support the pin 190 in a slight swell. The ledge communicates from its offset position with the vertical slot by a camway section 198. This camway is provided to insure entry of the pin 190 into recess 194 in response to an upward pull on movable telescoping member 184, and also to insure its removal from said recess when it is required that the post collapse as will be explained.

Telescoping member 184 is provided with a vertical slot 200 for the reception of the pin 196 fitted in the lower end of the member 186. Slot 200 lies adjacent the pin 190 and provides a recess 202 beneath the pin 190 and a hooked recess 204 for reception of the pin 196'. The upper end 206 of member 186 is beveled and provided with a hanger receiving slot 208. This slot may be spiralled as shown in Figure 6e for a purpose to be explained.

Pin 196 and slot 200 are smaller than pin 190 and slot 192. With pin 190 in recess 194 slot 200 lies in alignment with the lower side 210 of camway 198. Pin 196 is long enough to extend partially outwardly of slot 200 and into the slot 192. In order to permit passage of pin 196 to slot 192 the grooves 212 and 214 are provided for its passage from either of its possible angular positions with respect to the base member 182.

Considering the post to be extended upwardly and the pins 190 and 196 in their respective recesses 194 and 204, the post is collapsed by turning the top member, as by means of pulling the hanger straight up through the spiral slot 216. Such turning of the member 186 causes at least one of the pins 196 or 194 to move out of its recess. The weight of the member or members carried by the pins released causes the member or members to drop.

Assuming that only pin 196 is released from its recess 204 by the rotation of the topmost member it will be clear that the member 186 drops and pin 196 follows slot 200, passes through groove 214 and strikes on cam surface 210. Since the pin 196 is in engagement with the left side of slot 202 and traveling with considerable energy, the reaction of the cam 210 is to move the member 184 so that slot 200 moves toward registry with slot 192 and so that pin 190 moves into camway 198. Accordingly, member 184 drops in response to its release by member 186.

Because pin 190 must slide in slot 192, slot 200 moves past registry with slot 192. Since pin 196 is now in slot 192 the recess 202 permits rotation of the member 184 relative to pin 196 at the time pin 196 strikes cam 210. Member 186 and 184 move down together. On the up movement sections 184 and 186 may move together, provided pin 196 stays in recess 202. In this case pin 190 is forced into recess 204 and pin 196 passes on through grooves 214. If pin 196 precedes pin 190 upwardly, the latching is effected by manually rotating the pins into the ledge recesses.

If it happens that section 184 is first to release in the collapse of the standard, it pulls pin 196 against the cam 210 and releases member 186 to travel down in section 184, member 196 being retractable into member 186 to permit it to clear member 182. To this end member 196 is mounted on the leaf spring 195 retractable into recess 218 in member 186.

By providing the spiral notch 216 in member 186 the slight upward and rotational thrust produced by the upward pull of the hanger produces a sufficient rotation and lift of the member 186 to release it first without releasing the member 184. The entire stand is insured to drop out of the bag 52 whichever section is released.

The standard must be extended to its full length in order to insure that the fabrication of the bag always occurs at a definite distance above the garment and so that the bag is not too long. To this end it will be noted that the release of member 186 prior to the time either pin is seated permits the dropping of both members to the fully retracted position. Inasmuch as member 186 forces member 184 to extend itself first, the release of member 186 before it enters recess 204 results in collapse of member 184 also. If member 182 should happen to be released first, pin 196 is released by cam groove 213 which is in the path of its movement and directed to force pin 196 into groove 200 and to slide inside tube 182 until it is free to move laterally in recess 202.

Another method of making a bag corner is illustrated in Figures 8a to 8d. After the paper is cut the corners are rolled and then the rolls are flattened and fastened as is shown in Figure 8d. This makes a strong, rigid joint. The mechanism used replaces the flaps 112 and comprises a slide member 222 traveling in a dovetail track 224 in plate 26. After the cut of the paper is made, the mechanism, including folding scroll 226, slides against the corner 34' in a direction which is normal to the desired fold line 56. The paper so engaged rolls within the scrolls and, when a sufficient rolling has been effected, the fastener stapler 126' is operated to flatten the paper and fasten it together.

The machine shown particularly in Figures 11 through 47 and 54 and 55 comprises a frame including upright side members 300 and 302, joined by upright back member 304. Back member 304 is open as at 306 to provide access from the rear as well as from the open front of the machine to the interior of the frame. A platform 308 is joined with side members 300 and 302 and with back member 304 to form therewith a substantially rigid frame having a base 310 extending from the sides and back and which rests upon a floor 312 or other support. Cross members 314 and 315 extend between the side members as shown to add further to the rigidity of the frame.

Before proceeding with further detailed description, a general description of the operation of the machine will be given. In Figures 11, 12 and 13 there is shown a support 316 for a hangered garment, and a roll 318 of tubular paper in sheet form. With the support 316 in a garment supporting position, as in Figures 11 and 12, a garment on a suitable hanger is hung on the support, the hook 320 of the hanger being placed in a notch 322 on the support 316. The garment has been omitted from the illustration.

A web 324 of tubular stock is extended over a path which includes the flat surface 326 in the bag forming region, and thence down so as to envelope the support 316 and the hanger as well as a part of the garment supported thereon, the amount of the lower portion of the garment left uncovered being slightly less than the distance from the top of the garment to the cutting line, hereinafter referred to.

The operator then presses on a pedal 328 to initiate and to effect a series of operations. The first of these comprises a partial severance of the tubular web, as shown in Figure 48, from two points 330 and 332 near and about equally spaced from the center line of the stock, to and through the side edges of the tubular stock.

The next operation includes the folding of two upper corners of the partially severed tube into a position as is shown in Figure 49. The web portion 335 of the tube extending between points 330 and 332 in Figure 48 being left unsevered. These uncut portions form the connecting link through which the tubular stock on roll 318 is drawn forward preparatory to forming the succeeding bag, and also serve as part of means for insuring proper cutting of the tube stock 324 in the manner indicated, as will be more particularly explained. Upon completion of this folding operation, the flaps are suitably fastened as with staples 333.

Further reference to Figure 49 will show that the folding operation has resulted in the formation of a neck portion 335, the sides of which extend respectively between points 334 and 336 on one side and points 338 and 340 on the other side. These sides are really edges cut by the action of the folding mechanism. These sides are parallel as shown in Figure 49, and extend parallel to the tube axis and sides, forming an obtuse angle at the points 336 and 340 with the fold line. The corresponding edges 342 and 344 of the flaps formed by the tearing, are turned down and are disposed inward toward the axis of the tube with the adjacent portions of the flaps in contact with the main body of the tube. This construction makes secure the formation of a closure throughout the length of the folded edge of the flap and leaves a definite opening 337 between points 336 and 340 for the passage of the hanger hook 320. Spreading apart of the two webs 430 and 432 at the neck opening is effectively prevented due to the interlocking of the neck portion with the flap portion. This interlocking is made even more secure by turning the forward neck portion 431 of the web down forwardly, as shown in Figures 52 and 52a.

When the bag end has been formed as in Figure 49, the bag is drawn down over the hangered garment and into a position wherein the uncut portion is adjacent to but above the hook 320, at which position the severance of the neck portion 335 is completed and the bag is drawn down to expose the hook through the opening formed at the neck. The break of the uncut portion 335 is easily accomplished manually by the operator.

The hangered garment is now removed from the machine by grasping the hook 320 so as to support the hanger and garment by hand and thereupon releasing the garment support 316 so that it drops to the position shown in Figure 13 and in which the support is sufficiently depressed to permit the garment in most cases to be carried forward directly from that position in which the garment is supported in the machine and without lifting the garment. Support 316 is then returned to that position in Figure 11 preparatory to the placing thereon of another hangered garment.

The construction, operation, and certain special features of the support 316 will now be described. The support 316 comprises a tube 346, the lower end of which is rigidly but removably fixed on the platform 308 (Figure 29) by a clamping bracket 348 of tubular form providing clamping wings 350. The tube 346 and related elements, as is shown in Figures 24 to 28, are readily removed from the bracket 348 for a purpose to be described. The bracket 248 further provides the site for mechanism linkage to be later described and by which the release of the upper portion of the support is effected for movement from the position shown in Figure 11 to the position shown in Figure 13.

The tube 346 has fixed therein, near its lower end, a plug 352, defining with the tube a cavity 354 within which there is disposed a lever 356, and a spring 358 formed of flat spring steel and of the shape illustrated in Figure 25 and having its ends lodged in sockets provided at 360 in the wall of tube 346 and at 362 in the lever arm 356, at a point offset from the lever fulcrum 370. A slot 364 is provided in the wall of cavity 354 for the dual purposes of orienting the support angularly as respects its vertical axis, as will be more particularly referred to hereinafter, and of aligning the lever for actuation by releasing linkages to be described.

The support 316 further includes a second tube 366 which fits within tube 346 for telescopic sliding therein between the position shown in Figures 11 and 24 and that shown in Figures 13 and 24. Tube 366 is provided at its bottom with a plug 368 rigidly secured therein. A shaft 370 is journalled in plug 352 to extend parallel and eccentric to the axis of both tubes, the shaft being held against movement longitudinally of its own axis and with respect to plug 352 by collars 372, but being freely rotatable through a small arc about its axis in the journal provided by plug 352, against the action of spring 358.

The plug 368 slides on shaft 370 between collar stop 372 and a second collar 374 on the shaft, the latter defining the upper limit of the telescopic movement of tube 366. The tube 366 is prevented from rotating within tube 346 by positioning the shaft 370 eccentrically as shown, thus insuring that the plane of the hanger in Figure 12 will always be that for the accommodation of the tubular paper, that is, parallel to the bag face as it issues over the forward edge of plate 326 of the machine.

A guide 376 is journalled on shaft 370 and fits inside the tube 366 with a sliding fit so that shaft 370 remains parallel to the tube axis. Guide 376 remains fixed angularly and axially with respect to the tubes, while permitting the shaft 370 to rotate therein. The upper end of tube 366 has a closure plug 378 fixed therein to which is fixed the hanger bracket 380 and return device 392, to be described. The guide 376 forms a cavity 382 of variable volume with tube 366 and plug 378, for a purpose to be detailed presently.

The plug 368 has secured thereto a pin 384 having a latching notch 386 thereabove a distance about equal to the combined vertical dimensions of collar 374 and guide 376; guide 376 provides a passage 387 therethrough to pass pin 384 to project into cavity 382. A latch trigger lever 388 is secured to shaft 370 for rotation therewith, being normally positioned as is shown in Figures 27 and 28 by spring 358 and a trigger lever stop pin 390 secured in guide 376. The pin 384 is provided with a beveled surface 385 on its upper end. As the tube 366 is drawn upwardly, the pin 384 projects through passage 387 causing its surface 385 to strike edge 389 of trigger 388 and move it counter-clockwise, as shown in Figure 27, until the notch 386 registers with the trigger 388, whereupon spring 358 snaps the trigger into the recess, thus latching the tube 366 in the raised position, as is shown in Figures 11, 12 and 24.

The upward movement of the extension tube 366 is effected by raising the cross bar 392 manually. The bar 392 is part of a loop 394 which is welded to the post 380 as at 396 (Figure 25) and at a point above the end of tube 366 when the latter is in collapsed position. The lateral portions 398 of loop 394 (Figures 12 and 24) are spaced apart so as to form points of support close to a vertical line through the notch 322, so that the hangered garment rests against the loop in a position to receive the open end of the tubular stock.

The release of the latch 388 is obtained upon application of a thrust against lever 356 secured to the lower end of shaft 370. The release of this latch results in gravital acceleration of the collapse of the extension, which force is permitted free action by providing an air escape port 400 (Figure 25) through the wall of tube 366, at a point a few inches below the upper end of tube 346 under collapsed conditions of Figure 25. As the tube 366 drops with port 400 above the upper end of tube 346, all air within the tubes and between plugs 352 and 378 is free to escape. After port 400 falls below the top end of tube 346 the air remaining between plugs 368 and 378 cannot readily escape and is, instead, compressed, thus acting as a cushion and decreasing the movement of the tube 366 as the support moves into the position in which it is shown in Figure 13.

The releasing mechanism for the extension tube 366 also includes a foot operated button 402 (Figure 29) located slightly above platform 308 and secured to a plunger rod 404 passing through aperture 406 and secured to a lever arm 408 which is in turn secured to a shaft 410 journalled in brackets 412 mounted on the bottom of platform 308. A second crank 414, secured to shaft 410 for rotation therewith, has linked thereto, by pin 416, a plunger 418 which is extended through a gland-nut 420 fastened in bracket 348 so that the end 422 of plunger 418 extends through slot 364 to a point adjacent lever 346 within cavity 354. Pressure on button 402 causes the plunger 422 to move lever 356 into a position to release the latch 388 from recess 386 in pin 384. Plunger 418 is normally retracted by a spring 424 surrounding the same and bearing on nut 420 and yoke 426.

The gland nut 420 is threaded into the lower end of bracket 348 and is provided with a reduced end 428 which projects partially into the path of tube 346. The end 428 is of a diameter to fit within the notch 364. Thus the support 316 is aligned with the tubular stock as the latter moves into garment covering position. The support 316 is readily removable by an operator, for reasons presently to be described.

The provision for loading, dispensing, and controlling the dispensing of the stock of which the bag is made will now be described in connection with Figures 12 through 23, 30, 50 and 51.

Flattened tubular paper has heretofore been made in a manner somewhat as follows: A web of a width slightly greater than the perimeter of the tube is folded along two parallel lines about equally spaced from the edges and separated from each other by the half perimeter of the tube (supposing the tube to be distended to circular form), so that the opposite edges overlap near the middle of the central panel, the overlapping edges being suitably united as by glue to complete the peripheral integration of the tube. Such tubular paper cannot be provided in satisfactory rolls because the stock is thicker at the seam along the center line of the tube by one thickness of web than at any other portion of the tubular web.

In accordance with this invention, the tubular stock is preferably made from two distinct webs 430 and 432 (Figure 50) of equal width, juxtaposed as shown, with a deposit of adhesive 434 therebetween along each edge, the two webs 430 and 432 being rolled together so that a substantially uniform thickness is achieved throughout the cross section of the tube and so that air is substantially removed from the tube as it is being placed in roll form. As this stock is rolled from the gluing rolls onto its core 436, the roll resulting is cylindrically compact from end to end which results in satisfactory dispensing characteristics and permits the uniform distribution of tension in the stock.

In describing the steps employed in the construction of the bag, it was pointed out that the unsevered or neck portions 335, shown in Figures 48 and 49, are subsequently broken by hand. Since only two plys of the sheet material are present, this severance is much easier than if tubing using the lapped center joint were used, and the severed neck portions are readily folded into the protecting position shown in Figures 52 and 52a.

If the upper sheet or web 432, shown in Figure 50, is regarded as being wound nearest the axis of the roll, it will be found that it forms the rear wall of the bag as formed in the machine, that is, it represents the rear sheet as seen in Figures 49 and 52 and, therefore, when the folds are formed, the folded portion of sheet 430 is protected by the over-folded portion of the web or sheet 432. The securing staples 333 engage only against the sheet 432 at both sides of the bag. This fact is employed to advantage in order to make a bag in which wall 430 is of transparent material such as cellophane and the other of which is of a strong stock, such as kraft paper. The transparent material is desired to the purpose of permitting the cleaning establishment to bag the tagged garment immediately it has been finished for delivery to the customer, allowing the clerk to see the tag through the window and the customer to satisfy himself by personal inspection of the garment through the transparent bag wall that the garment is his and is in an acceptable condition.

This transparent material may be chosen from a variety of materials one of which is cellophane; such transparent materials usually tear easily. Referring to Figure 50 again, if the web 430 is made of transparent material, and web 432 is made of kraft paper, web 430 is protected by web 432 from tearing by the staples 333 used in holding the fold portions shown in Figure 49.

It has been found preferable to maintain a degree of tension in the webs transverse to the plane of severance while making the severing cuts shown in Figures 48 and 49, for several reasons which will be pointed out in due course, but which include the facilitation of the cutting operation. To attain this objective I ensure that tension extend in the material from the roll to the line of severance.

This I accomplish by securing the roll of tubular stock against rotation until the initial severance occurs. The innermost convolution of the roll of tubular stock is secured to a rigid cylindrical core member 436 (Figures 20, 21 and 51) so that there can be no relative rotation between the convolutions of the roll and the core 436. It is through this core that mechanism, presently to be described, is effective to hold the roll end of the web 324 of stock in tension until and during the severance along lines 330 and 332, as shown in Figure 48.

The roll support comprises a U-shaped assembly provided by parallel arms 438 and 440 which are rigidly secured to, and near the ends of, a shaft member 442 extending between the sides 300 and 302 of the frame. The arms are pivoted parallel to the rear wall 306 on trunnion brackets 444 and 446 fastened to the platform 308 about midway between the rear and forward edges thereof so that the shaft 442 lies behind bracket 348.

The arms 438 and 440 and the shaft 442 are made of such metal that they may be sprung into the dotted line position of Figure 17 and then return to the full line position through their own restitutional capacities. The arms 438 and 440 are preferably made of rectangular steel strips, as shown, to provide bearing support for the core 436, and further provide support for the presently described mechanism effective to control the freedom of rotation of core 436.

The bearing supports are illustrated in detail in Figures 20 and 21; the bearing support provided upon arm 438 includes a pin 448. A sleeve 452 is mounted for rotation upon pin 448, the sleeve and its integral centering head 454 being retained in place by a head 450 upon the pin 448, the pin 448 being suitably secured to arm 438 as by threads 449. The centering head 454 is of a diameter such that it fits snugly in the core 436 and is spaced from the arm 438 a substantial distance by the sleeve portion 452 being held against axial movement by the head 450. The other bearing support mounted upon arm 440 includes a conical member or ring 470 journaled upon a pin 472, secured to the arm 440. The centering ring or cone 470 includes a shoulder 474 which abuts against the end of the core 436 and spaces this and the tubular stock thereon from the arm 440. The axis of pin 472 and pin 448 are coincident with the internal longitudinal axis of the core 436.

At the end of the core 436, which is mounted on a metal cup 455, is provided an internal cylindrical sleeve portion 456 which is drawn from a blank to provide a spider or wall 458 and a rim 460; wall 458 and rim 460 serve to assist the sleeve portion 456 in retaining its circular section, the spider 458 forms a stop for centering head 454 while the rim 460 determines the depth to which spider 458 is inserted inside the core and insures that the sleeve 456 takes a position concentric with the core 436. Sleeve 458 is secured against rotation and displacement in core 436 by having tangs 462 struck radially outward into the core 436, the latter usually being made of wood or paper. The sleeve portion 456 is of sufficient axial length to accommodate the head 454 and a portion of sleeve 452 to leave a portion of sleeve 452 projecting axially outward of the rim 460 so that the rim 460 is positioned with a fixed clearance from arm 438 at all times.

The sleeve portion 456 with wall portion 458 provides a snug cup-like seat for the head 454 so that the head 454 rotates with the sleeve about pin 448, the axis of the core 436 being coincident with that of pin 448. The portion of the sleeve 456 surorunding bearing sleeve 452 presents a concentric friction surface or brake drum, and the annular space between the two sleeves and surrounding sleeve 452, accommodates an accurate brake shoe 464 carried by a hub 465 journalled on a pin 466 in arm 438. A crank arm 468 is secured to the outer end of hub 465 for imparting oscillatory movement to the brake shoe, a suitable friction surface 469 being provided on shoe 464 for engagement with surface 456. By turning crank 468 clockwise, as viewed in Figures 13 and 19, the roll 318 is prevented from rotating clockwise. It will be clear that the space between rim 460 and arm 438 provides clearance for the movement of arm 468.

The arms 440 and 438 are connected at their free ends by two telescoping members 476 and 478 (Figure 18). Member 476 is tubular and is provided at one end with a coaxial pin 480 which passes loosely through a hole 482 in arm 440, washers 484 and cotter pin 486 securing the assembly in a loose jointed linkage. Member 478 is a rod fitting slidably in the tube 476 and linked by pin 488 and secured to arm 438 in a similar manner to the linkage of pin 480 to arm 440. The length of tube 476 is about equal to the distance between the left end of sleeve 452 and the right end of centering bearing pin 472, the parts in Figure 18 being shown in a position corresponding to the dotted line position of these in Figure 17. Member 476 also serves as a handle with which to shift the loading rack between positions of Figures 13 and 15.

When the roll 318 is in position to deliver tubular stock (Figures 12 and 13), the arms 438 and 440 are held firmly against the ends of tube 476, the intermediate portions of these arms being sprung slightly inward to force the centering ring 470 and centering head 454 firmly into position in the ends of core 436 and to secure the roll axis exactly horizontal and parallel to the rear wall 304 of the frame. These holding and positioning functions are obtained by centering and aligning lugs 490 and 492 (Figure 12). These lugs each include a base 494 (Figure 23) securing the lug to one of the side walls 300 and 302, a cam portion 496 having an inclined portion 498 and a straight portion 500 and a stop 502. These lugs are arranged to engage the arms 440 and 438; as the arms are moved from the second loading position, illustrated in Figure 15, to the final position of Figure 13, they engage the incline portion 498 on each lug and finally seat against stops 502 and rest against surfaces 500. The positions of the stops 502 and shaft 442 is, as shown, such that gravity maintains the roll in position when base 310 is horizontal.

It is one of the functions of the roll support to assist in the loading of the roll of stock. The loading is accomplished as follows: With the various parts in the relative positions shown in Figure 13, the support 316 is removed from its bracket 348 to allow an operator to grasp tube 476 as a handle and pull the arms 438 and 440 forward. In anticipation of such movement, however, the roll of tubular stock to be inserted is preferably rolled on the floor to the approximate position in front of the machine as shown in Figures 14 and 16, with the free end of the web of stock issuing from the roll toward the machine as shown in Figure 15, the cup 455 of the roll 318 being on the brake side of the machine. The arms are then moved to the approximate position shown in Figures 14 and 16 where the centering members 454 and 470 are stopped by the roll; if the core of an exhausted roll remains, it is suspended between the centering members in this position. The arms 438 and 440 are now grasped near their outer ends and spread apart, as illustrated in dotted lines of Figure 17, and, while so related, they are brought to an approximately horizontal position, as illustrated in Figure 15, wherein the ring 470 and head 454 are in approximate registry with their seats in the ends of core 436. The arms are then released to force these parts into the core 436, as illustrated by Figures 20 and 21.

It will be observed that the freedom of the arms to separate, as shown in Figure 17, is insured by the loose connections and telescoping parts, as shown and described in Figure 18. The spring action of arms 438 and 440 with shaft 442 temporarily secures the roll firmly between the centering heads 470 and 454 by raising the handle 476 slightly, some of the stock 324 is released from the roll and can be pulled toward the rear wall 304 as shown in Figure 15.

When the arms 438 and 440 are in that position in which they are shown in Figures 14 and 15, the brake shoe 464 is retracted to the position shown in Figure 19, thus insuring that an empty core is easily released upon spreading the arm to the dotted line position shown in Figure 17 without the interference of the brake lining 469 and the drum 456, as well as permitting the brake shoe to be inserted within another sleeve 456 without engaging it. This action is insured by the arrangement of the brake actuating linkage whereby gravity is utilized to release the brake in this position of the arms rather than to secure the brake as is the case when the arms are in the position of Figure 13.

The brake actuating linkages include arms 504 and 516 having one end pivoted to arms 438 and 440, that pivoted to arm 438 being by a pin 506 at a point intermediate between the journal 444 and the pin 448. A pair of pins 509 and 511 on arm 438 are disposed to engage the associated arm 504, as will be described. A link 467 (Figure 12a) is pivoted to arm 504 at 503 and to arm 468 at 505 (Figure 19).

As seen in Figure 13, the brake is engaged, the weight of arms 504 and roller 510 being sufficient to effect this purpose and prevent rotation of the roll. In this position, arm 504 is supported through the linkages 504, 567, 568, the brake lining engaging the brake drum. In the absence of the drum 456, the pin 511 prevents excessive clockwise movement of arm 504; when the arm 504 is in a position corresponding to that shown in Figures 14 and 15, thus ensuring that the brake shoe 464 does not extend outwardly to engage the cup 455 so that the cup can be easily placed over the centering head 454.

In moving from the position of Figure 13 to that of Figure 14, the arms 504 and 516 are shifted forwardly of a vertical line through its pivot 506 on arm 438, either by direct shifting with the hand or by a rapid movement of handle 476 to the position shown in Figure 14, which movement is suddenly stopped at or before this position, causing arms 504 and 516 to shift of their own inertia and that of the associated linkages. After the roll 310 has been placed in the position shown in Figure 15, the operator raises the support by handle 476 and thrusts the assembly over center against the lugs 494, whereupon brake arm 504 takes the brake set position of Figure 13. It will be observed that the burden of lifting becomes progressively less as the roll is lifted from the floor. The lifting force required is diminished in the ratio of the lever arm at the handle over the lever arm of the axis of the roll. Thus the greatest exertion is required only at the accessible region in front of the machine.

The web portion 324 of the stock is now extended so as to be threaded through the path provided in the machine as indicated in Figure 13. In order to so extend it, the brake must be released. To this, and other important ends, a tubular roller 510 is provided, supported by pins 512 and 514 in arm 504 and a similar arm 516 mounted on arm 440 in a manner similar to the mounting of arm 504 on arm 438. Since both arms 504 and 516 are freely linked at both ends, it is clear that either end of tube 510 may be shifted without greatly changing the position of its other end. This freedom is of utility as will be pointed out presently.

It will be noted that stock 324 is shown as threaded under tube 510 in Figure 15. Accordingly the movement of stock 324 upwardly, as in Figure 13, tends to raise the member 510 horizontally, thus raising brake control arm 504 and releasing the brake so that the roll 318 turns freely.

The cutting, folding and stapling mechanisms and their functions will now be described in connection with Figures 30 through 45 inclusive. The base for these mechanisms is the rigid metal plate 326 shown most comprehensively in Figures 31 and 32 and shown in side elevation in Figures 30 and 37. This plate is mounted on top of the side walls 300 and 302 with its main surface inclined toward the front of the machine, a disposition advantageous for reasons to be explained. The plate 326 provides front and rear cylindrical surfaces forming aprons 520 and 522 disposed downwardly with their axes horizontal, parallel to each other and to the axis of roll 318, as seen in Figure 13. The greater portion of the upper surface of plate 326 is left free for the accommodation in flat disposition thereon of the double ply forming the tubular stock and which normally passes over the plate between the dotted lines 518 in Figure 31; that area to the right and left of the area between the lines 518 being free, as will be apparent.

As is shown in Figures 30 and 31, a bar 524 of angle section spans the area between its end 526 and end 528 (Figure 31), being secured with its lower surface 525 in parallel spaced relation to the upper or working surface 530 of plate 326, by screws 532, the spacing 534 being provided by washers, not shown, surrounding the screws between the plate and the bar. Two slots 536 and 538 in plate 326, parallel to the forward edge of bar 524 and below the same (Figure 30), extend from points 540 and 542 (Figure 32) near the center of the bar and plate to their lateral ends 544 and 546, leaving a bridging portion 548 therebetween. A cylindrical shaft 550 extends across the plate 326 above bar 524 and parallel to the slots 536 and 538. The shaft is supported in this position by angle bracket 552, the foot 554 of which is fastened to bar 524 opposite bridge 548 and by two additional angle brackets 556 and 558 similar to 552 secured to the right and left ends of plate 326.

As is illustrated in Figure 30, the bracket 552 includes a projection 560 thereon extending forwardly and providing a support for a friction pawl or clutch 564 which is pivoted to the projection 560 by a pin 562; the friction pawl or clutch 564 rides upon the upper surface of the two ply web 324, permitting the web to be drawn forwardly from the machine into envelope-forming position, but preventing the web from returning to the roll under the tension provided by the transverse member 510.

The clutch 564 completes the apparatus for maintaining the web 324 in longitudinal tension while the cutting is effected, which apparatus will now be explained. As may be seen in Figure 30, the stock 324 is extended over and in contact with plate 326 through space 534, over and forward of the slots 538 and 536 and under the foot 566 of clutch 564. It will be evident that the stock is prevented from sliding back toward roll 318 by the gripping action of clutch 564 while tension is maintained by the roll 510 which rides on the stock 324, the roll being freely movable by the arms 504 and 516 because of the looseness of the connections, as illustrated in Figure 22.

Forward movement of the stock and unreeling of it from roll 318 is permitted because a pull on the stock raises foot 566 and tends to raise roller 510 to take up the lost motion in the linkage shown in Figure 22, and results in releasing movement of brake arm 504. The stop 511 prevents the excessive movement of the brake arm in this action, thus avoiding braking action on the opposite side of the brake drum during unwinding of the stock.

The roller 510 has another function; in the manufacture of the tubular stock here described, there is some lack of absolute uniformity in the thickness of the tube at the edges, which may result in a very slight though nevertheless material variation in the rate of feed of the material from the roll. This would, in the absence of freedom in roller 510, result in a non-uniform tension over the width of the stock. However, since the roller ends are free to move vertically with respect to each other, the non-uniformity is compensated and a uniform tension is maintained, thus causing the material to lie flat on plate 326 across the slots 536 and 538 during cutting.

The severance of stock is by cutting, and the cutting blade is usually an ordinary one edge razor blade 570 (Figure 36). The provision for the use of such blades avoids cumbersome and time consuming servicing of special cutting devices, since the blades are of very lost cost and can easily be replaced by new ones as they become dull. Notches 572 are provided at both ends of such blades, as they are presently available, a provision which permits reversal of a blade after it has been worn in one region, so it can provide all available cutting edge.

In accordance with this invention, the stock is cut simultaneously along lines 330 and 332 and outwardly toward the edge (Figure 48), and to achieve this, each of two blades is mounted to oscillate between two positions, as is shown in Figure 33 by the solid and dotted lines; the solid line position indicates that of retraction from cutting position, the lowest extremity of the blade being above the space 534; the dotted line position is that to which each blade is rotated upon the initiation of the cutting stroke in Figure 33 along slot 536 and slot 538. In this initial movement, the end corner of the blade pierces the stock and cuts into it with a slicing action, taking the dotted position with the cutting edge inclined at an acute angle to the direction of cutting of the paper.

A blade holding arm 574 is provided for each blade, each arm having a pointed end 576 having a head 578 thereon, the latter snugly engaging a notch 572 in blade 570. The upper edge 580 of arm 574 provides a stop against which the edge 579 of the blade backing 582 is engaged in inserting the blade in position on the arm. The forward face of arm 574 is flat and receives the rear face of the blade. A flat spring 584 is secured flush to the front face of arm 574 by a screw 585 (Figure 33), providing an edge 586 projecting slightly upward of edge 580, thus providing a crevice between arm 574 and spring 584. The free end 588 of the spring is bent at the screw 585 so the spring is biased forwardly of the arm and extends in front of the blade position, as is shown at the left in Figure 33. The blade is inserted between the spring and arm in the position shown, the blade remaining in the dotted line position due to engagement of the backing 582 with the upper edge of the arm. The spring is next clamped against the front face of the blade by a thumbscrew 590, the shank 592 of which passes freely through a hole 594 in the spring and is threaded into a support 596, as is shown in Figure 34. An annular shoulder 598 on the shank 592 beneath the head of the screw 590 engages the spring to clamp it toward the face of arm 574. The rear face 600 of arm 574 is disposed for sliding engagement with the front face of the rail 602, forming one portion of a guide shoe. The end of arm 574 is cut away at 576 to permit the arm to clear plate 326 in the inserted position of the blade, but otherwise the arm provides rigid support for the blade.

The arms 574 are supported on oscillatory members 604 and 606 which are pivotally mounted on and which rotate with pins 608 and 610; the pins are journalled through slide blocks 612 and 614, the blocks being mounted for sliding on shaft 550. Each arm 574 is secured in spaced relation to oscillatory members 604 and 606 by screws 585 and 616 passing through the arm and a spacing block 618 having a thickness such as to permit the front face of the member 604 and the rear face of arm 574 to slide longitudinally on rail 602 while insuring that the blades move in a single cutting plane. The oscillatory motion of the members 604 and 606 is limited by stop pins 619 and 620 on the oscillatory members which engage the bottoms of the respective slide blocks at the limits of movement of the arms 604 and 606.

Pin 608 extends rearwardly of block 612 and carries a drum 622 fixed to the pin for rotation thereof. Member 606 is itself shaped as a drum similar to drum 622. A sheave 624 is mounted at the left end of the bar 524 (Figure 31) and two sheaves 626 and 628 are mounted as shown at the right end of bar 524 in Figures 31 and 37. Mounted for rotation about the horizontal axis of shaft 630 at the right side of the machine, as seen in Figures 31 and 12, is a relatively large driving drum 632, which is actuated in an oscillatory manner, later to be described. One end 633 of a flexible steel multiple strand cable is anchored on the side of drum 632 and passes through a hole 634 onto drum 632 about which it is looped and from which it issues at 636 (Figure 27) to sheave 628. From this sheave, the cable passes on a tangent, approximately indicated by line 638, and thence approximately parallel to shaft 550 (Figure 24) and tangent to drum 606, making a complete loop about drum 606. The cable then passes horizontally along line 640 (Figure 24) parallel to shaft 550, passing around sheave 624 and returning along path indicated by line 642 parallel to shaft 550 and tangent to the bottom of drum 622 about which it makes a complete loop. The cable issues along a path indicated by line 644 to pass around sheave 626, from which it returns to driving drum 632 along a path indicated by line 646. The cable then passes through a hole 648, its terminal 650 being anchored to spider of the drum 632 through a tensioning spring 652 (Figure 27). The spring 652 maintains the cutter actuating cable tight and simplifies the synchronization of the operations of the cutters.

With the actuating cable tight and the blades 570 in the starting position of Figure 33, the cable is fastened to the tops of the two drums 606 and 622. For this purpose (see Figure 53) a stud 654 is fixed radially in these drums through which a hole 656 is provided tangent to the drum. The cable is threaded through this hole and a nut 658 is threaded against the cable to clamp it against slipping over the drum. The annular rims 660 of the drums are cut away to clear the nut 658 at this point on the drums.

Referring to Figure 33, it is observed that pins 608 and 610 pass through blocks 612 and 614 above the shaft 550, and in Figure 34 that drum 622 is secured on a spacing sleeve 662 which is in turn fastened to pin 608. The section of these elements in Figure 34 is only of those parts behind oscillating member 604. The blocks 612 and 614 are provided with sleeves 664 which, coupled with the inertia of the blocks themselves, provide a starting resistance to their movement. In this way the blocks initially act as stationary journal supports for the pins 608 and 610. Therefore, the initial pull by the driver drum 632 clockwise results in the motion of oscillating member 607 counterclockwise, and movement of members 604 and 606 to positions corresponding to the dotted line position of blade 570, in which positions the blades have penetrated through the stock at points 330 and 332 of Figure 48, to initiate the partial severing cuts.

The driving drum 632 is actuated by mechanism illustrated in Figures 11 and 37, which mechanism also includes the drive for other operating mechanism to be later described. The driver drum 632, with an anchoring drum 666 for driving cable 674 secured thereto, is freely journalled on shaft 630, being held axially thereon between a collar 668 and a shaft driving drum 670 for shaft 630. Shaft 630 is supported from the bottom of plate 326 by a series of three pedestals 672 (Figures 32 and 38).

The anchor drum 666 is provided with two circumferential grooves 665 and 667. A driver cable section 674 extends, in the at rest position illustrated, partially around the drum in groove 667 in a clockwise direction to a point 676 where it is securely anchored to the drum 666 as by welding. A return cable section 678 rests in groove 665 and has its terminus 680 anchored to the drum 666, as shown. A return spring 682 is joined to the lower end of return cable section 678 and to an anchor post 684 on the side wall 300.

The lower end of driver cable section 674 is linked to a take up spring 686 having a high resistance to extension. A double action drive cable section 688 is extended around a sheave 690 returning to be received in a peripheral groove 692 in the shaft driving drum 670, in which groove it is anchored as by anchoring weld 694. The shaft driving drum 670 is held from counter-clockwise movement during the cutting phase by a toggle mechanism 696 (Figure 37), which will be later described, so that the end 694 of double-action cable section 688 is temporarily held against movement during certain operations of the machine.

The sheave 690, about which cable section 688 is threaded, is carried for vertical movement by a treadle 698 pivoted to the frame at 700, the treadle sliding between vertical guides 702 and 704. The guides are mounted on the side 300 and provide upper and lower lever motion stops at 706 and 708. The treadle 698 is operated by an operator depressing pedal 328. Initial downward movement of treadle lever 698 transmits a pull through the cable 688 to drum 670. Movement of the left hand portion of cable 688 (Figure 37) does not occur since at this time drum 670 is latched against movement by toggle linkage 696, although a pull is transmitted through spring 686 to cable section 674. The initial phase of treadle movement produces a counter-clockwise rotation of anchor drum 666 and driver drum 632 through an angle of approximately 220 degrees. This rotation is resisted by spring 682 through return cable section 678, the spring 682 being tensioned during the downward stroke of lever 698 and this is utilized to return the cutters to starting position during a later phase of the operation. Only a major portion of the approximately 220 degrees of counter-clockwise rotation of driver drum 632 is utilized to effect a partial severance of the stock along lines 330 and 332 (Figure 38), the blades 570 being moved to a position in the end zones of the grooves 536 and 538 near 546 and 544 and beyond the edges of flaps 778 and 780, in which end zones the blades move during the remainder of the rotation of the driver drum. Motion of the driver drum 632 is arrested by engagement of blocks 612 and 614 with end brackets 658 and 656, an event which occurs while the treadle 698 has only moved part way along its normal path, further movement of lever 698 being permitted to effect the folding and stapling operations, as will be described.

Just prior to the cessation of clockwise rotation of drum 632, a toggle trip pin 706 engages the foot 708 of the toggle mechanism 696 (Figure 37) and moves the toggle to release the drum 670 and pin 706 at about the position indicated in dotted line in Figure 37. The release of toggle 696 is followed by the operation of other mechanisms now to be described, the drum 632 remaining in the position in which it is stopped by the brackets 556 and 558.

The mechanism for effecting the folding operations will now be described. The fold is made in relation to the folding devices along line 710 (Figure 31) and the balance of the fold on one side is indicated by lines 712, 714 and 716 on the right-hand side of Figure 31. The outer ends of fold lines 710 and 711 at points 718 and 720 (Figure 49) are determined as follows: Referring to the means of fixing these points as illustrated in Figures 31, 39, 40 and 41, the fold line terminal determining devices 721 and 723 each includes a shaft 722 extending perpendicularly from plate 326 at a point offset laterally from the area of the fold. As is shown in Figure 39 particularly, shaft 722 has a bracket 724 mounted thereon for rotation. The bracket includes an arm 728 which extends horizontally in a spaced relation to the plate 326, a washer and a nut structure indicated by 730 being utilized for this purpose. The bracket is retained in place upon the shaft 722 by a washer and a head structure generally indicated at 732 (Figure 39).

A flat steel spring 734 is fastened to the arm 728 to extend parallel to the surface of plate 326 and forwardly to a point slightly in advance of point 718, and normally slightly above the plate 326. A second steel spring 736 is secured to the end of spring 734 at right angles thereto and disposed just above plate 326, as shown in Figure 31. The arm 729 is extended to form an inclined portion 738 to which there is secured a flexible leaf spring 740 extending rearwardly to a point 742 in the path of movement of oscillatory members 606. A helical spring 744 surrounding shaft 722 (Figure 39), having one end anchored in a hole 746 therein, is extended at 748 along and through the leaf spring 740, the spring 744 exerting a rotational force on the fold line terminal determining devices to hold them normally against stops 750 and 752. The device 721 is shown in the retracted or at rest position, while device 723 is shown as if it had been moved to operative position by oscillating member 606 at the end of its cutting stroke.

The inner termini 336 and 340 of fold lines 710 and 711 (Figure 49) are determined by means 754 including a hanger hook defining opening 337 for the bag, this opening being between points 336 and 340 as shown in Figure 49 after the bag is completed. The means 754 comprises a flat rectangular plate 756 (Figure 31) supported immediately above plate 326 with its lower surface parallel to plate 326, and having its ends 758 and 760 adjacent the ends of folding flaps to be described (Figure 34). The forward lower corners 762 and 764 of plate 756 assist in determining the points 336 and 340 while the lower edges of the ends 758 and 760 determine the lines from points 334 to 336, and from 338 to 340, as well as the edges 342 and 344 of the flap portions of the bag. The plate 756 is supported by a leg 766 dependent from extension 560, as is shown in Figure 30.

The folding apparatus further includes flaps 778 and 780, which are alike in symmetry and act in like manner; these flaps are shown as of a triangular shape. Flap 780 includes a side 782 which, when the flap in retracted position, defines with plate 326, a portion of the groove 538. The upper surfaces of the flaps are, in retracted position, flush with, or in the same plane as that of plate 326, so that the stock may slide freely thereover or lie flat over the entire central area of plate 326, the plate 326 being cut away to receive the flaps as shown. The flaps are provided to bend and complete the fold, and flaps 778 and 780 are accordingly mounted by hinges 788 and 790 along side 786 in such manner that the sides 782 and 784 may be moved to a position corresponding to the dotted lines 782' and 784' with the top face of the flap flat against that of plate 326, thus folding the bag flap to the shape as previously described on each side of the bag.

The flaps 778 and 780 each terminate adjacent the near end of the defining plate 756, and in the folding movement move as a shear along edges 758 and 760 to tear the stock along the line from point 334 to point 336 and from point 338 to point 340 in Figure 49. This action is facilitated by the fact that clutch 564 (Figure 30) with the other elements of the stock tensioning apparatus, maintains tension in the paper over the area surrounding the plate 756. It will be readily appreciated that the hinges 788 and 790 are preferably entirely below the upper planes of the flap and plate 326 in the retracted position so that the stock lies flat during the cutting operation and the cut edge of the stock is offered no projections in its path.

The construction and operation of hinges 788 and 790 are illustrated in Figures 32, 42 and 43. The flap and plate are cut away as at 791 and 792 to accommodate the interfitting cylindrical portions of the hinge in the retracted position. A hinge tongue 794 is fastened to the bottom of plate 780 and provides a cylindrical bearing portion 796 surrounding a hinge pin. The companion hinge member 798 is angular in section and its one leg is rigidly fastened at 800 to one end of a stiff flat leaf spring 802, the other end of which is fastened to plate 326. The other leg of the hinge member 798 extends between the plate edges and forms two aligned journals 804 and 806 to receive the ends of the hinge pin.

A hole 808 is provided through the hinge member 798 and spring 802 to receive a headed pin 810 anchored in plate 326, the head being disposed so that the pivot of the hinge normally takes the position shown in Figure 42 with bearing portion 796 flush with the upper surfaces of the flap and plate 326. (In Figures 32, 42 and 46, it will be understood that the elements are shown inverted, since these are bottom views.) In addition to the hinge supports described, the flaps are supported in retraction by fingers 812 secured to plate 326 and extending inwardly beneath the edges 784 of the flaps.

In forming the fold, the flaps are forced by means hereafter described, from the position shown in Figure 42 to the position shown in Figure 43, thus bringing their upper surfaces into contact with plate 326. The adjoining upper edges of plate 326 and the flaps are rounded off as at 814 to provide the necessary clearance (Figure 43).

The operation of the flaps is accomplished by a normally disconnected cam having a driving linkage comprising an arcuate actuating arm 816 underlying each flap and driven by shaft 630 from such a position below the opening in plate 326 that, upon rotation of the shaft, the free end of arm 816 engages cam follower 818 carried on each flap and rotates the flap 780, for example, to the position illustrated in dotted lines in Figure 46.

A roller 820 on arm 816 engages the surface of cam 816 to effect this motion. It will be observed that both flaps 778 and 780 are actuated from the same straight shaft, which is not parallel to either of the hinge axes of the flaps. The approximate track of the roller 820 on cam 818 is illustrated by the dotted line 822 in Figure 32. The cam follower 818 is formed of sheet metal, as is shown in Figure 46, and is welded to the underside of each flap 778 and 780.

As previously pointed out, the flaps are not actuated to form the fold until cutter blades 570 are in the fully operated positions in end zones 544 and 546, at which time the fold line termini determining arms 736 are also in their operative positions.

The initiation of the folding operation is by release of toggle 696 (Figure 37) and which comprises a toggle link 824 pivoted at one end by pin 826 to the upper side of drum 670 and to second toggle link 828 by a link pin 827, the link being pivoted by a stationary pin 829 to a bracket 830 secured on plate 326. The trigger foot 708 on link 824 extends into the path of movement of pin 706 carried by drum 632. The link 828 is biased to holding position against a stop 832 by a spring 834, the stop being so placed that link pin 827 lies slightly above the line joining the axes of pins 826 and 829.

When pin 706 strikes foot 708 a slight clockwise rotation is given drum 670, which is permitted due to the presence of spring 686, until link pin 827 passes across the center line of pins 826 and 829 immediately after which drum 632 is stopped, as previously pointed out; then the full effect of downward motion of treadle 698 is transmitted to drum 670, causing shaft 630 to rotate and drive flap operating arms 816 through about 90° of arcuate travel. This folds the paper, as illustrated in detail in Figure 41 and wherein the arm 736 is shown between the folds at the end 718 of the fold line.

The flaps 778 and 780 reach the final position substantially before the arm 816 completes its movement and while roller 820 is still moving on the curved portion of cam 816. During the remainder of the motion of arm 816, the stapling action is effected by mechanism, illustrated in Figures 31, 32, 44 and 45. The stapling mechanism comprises a stapling device 831 comprising a magazine 142' for staples and a driving member 141', as described in connection with Figures 5 and 5a; these are part of a conventional stapling machine. A stapler adapter arm 833 is pivoted to the lower face of the plate 326 by pin 835 in trunnions 837 which extend between the plate 326 and shaft 630, providing a follower 839 in the path of stapler actuating arm 841 rotated by shaft 630. Driver 141' is provided on its back with a round headed pin 843 which is received in a retaining hole in arm 833. The stapler assembly is dropped through an elongated opening in plate 326, the sides 836 of which prevent lateral rotation of the stapler unit about pin 843.

In this disposition of the stapler, the staples issue with their points 838 and 840 as is shown in Figure 31 upon actuation into the position of Figure 45. An anvil, or clincher, 842 is carried by each flap 778 and 780 into registry with points 838 and 840; the anvil is held in such position by the flap actuating arm 816, the roller of which is rolling on the cam follower 818 while the flap is in fully operated position and the stapler actuator 830 is actuating the stapler.

An impact is given to the shaft 630 by reason of the storage in spring 686 of a substantial amount of energy while the toggle 696 is being released, which energy is instantly released upon toggle release and results in rapid acceleration of shaft 630, assisted by the pressure on pedal 328. It will be observed that the flaps hold the folds therebetween in close contact with the main bag body during the stapling, thus insuring good stapling. A complete creasing at the fold lines is also insured by the transmission of great pressure through roller 820 onto each flap 778 and 780. It will be observed that the stapler may be easily removed and replaced for recharging with staples.

Upon completion of the stapling operation, the shaft 630 is stopped and hence the full pressure of the operator is placed on cables 688 and their connection to the drums. The shock incident to this stoppage is absorbed by spring 686.

Upon release of pedal 328, the shaft 630 is restored to retracted position by helical torsion spring 844 in which energy has been stored incident to operation of the shaft, thus releasing the flaps, which are instantly restored partially by springs 802 and partially by gravity as they fall into retracted position. Spring 834 completes the restoration of the toggle 696 to locked position, spring 682 retracts the treadle 328 and rotates drum 632 clockwise in Figure 37, thus releasing the arms 736 to their retracted position. Upon release of drum 632, the blades 570 are instantly retracted from the slots 536 and 538 so that the blades are above the stock passage 534 during their stroke, thus avoiding possible conflict in the event the operator should inadvertently pull the bag stock forward while the blades are moving.

The bag is now pulled down into a position corresponding to that in full lines in Figure 2, and the remainder of the stock is torn or cut by hand between points 330 and 332. The forward ply of the rectangular portion of the bag neck, defined by points 334, 336, 338 and 340 in Figure 49, may now be folded forward by hand to the position shown in Figure 52, preparing it to serve as a locking member to form a reinforced and bound neck opening as soon as it is spread open by further drawing the bag down to expose the hook, corresponding to the lower dotted line position in Figure 2.

The bagged garment is now ready for removal. The operator grasps the hook of the hanger and steps on button 402 to cause the support extension 366 to drop, thus removing it from inside the bag so that the bag can be moved directly forward with a minimum of lifting required for a long garment and bag.

Referring to Figure 51 it will be appreciated that the roll of stock 318 has its thickness, due to the bonding adhesive 434, concentrated in the end regions 435 thus providing a roll of more perfect cylindrical integrity. It will be evident also that the diameter of such a roll is relatively small for a given length of tubular paper because the tube has but two plies of paper as compared to three plies along the center line found in other tubing.

Referring to Figures 54 and 55, attention is drawn to the fact that, after the web 324 has been cut as in Figure 48, the stock turns upward as shown in Figure 55 due to the tension in the web and to the curvature of plate 326 at 522. Accordingly, as the web is drawn forward after cutting, the forward edge 325 of the stock avoids collision with edge 782 of flap 780.

While the invention has been described particularly as it has been applied to the fabrication of a garment covering, the invention can be utilized successfully to form and place a covering about any other article or commodity such as flowers, meat, fowls, bananas and any other article which lends itself to this form of packaging.

I claim:

1. In a device for placing covers over garments, a frame member, means for supporting a roll of tubular paper stock on said frame member, collapsible means for supporting a garment on said frame member in a position so that tubular paper from the roll supporting means can be pulled over the garment, means on said frame member for cutting the tubular paper to bag length, and means for fastening the paper to close the bag end.

2. In a device for forming bags over garments, a frame, a garment supporting post, means for supporting and guiding tubular paper to be drawn toward and over the supporting post, means for forming fastened folded portions in the paper so drawn at one end of the garment supporting post and means supporting the post for removal of the garment and bag by drawing the garment and bag as a unit in the direction of the post axis.

3. In a clothes bagger, a frame, means on said frame for delivery and fabrication of an end of a clothes bag from a tubular stock, and a telescoping and collapsible standard positioned on said frame for supporting clothes and for reception of the end of the tubular stock thereover prior to fabrication of the bag end.

4. In a device for placing covers over garments, a frame member, means for supporting a roll of tubular paper stock on said frame member, collapsible means for supporting a garment on said frame member in a position so that tubular paper from the roll supporting means can be pulled over the garment, means on said frame member for cutting and folding the tubular paper to form a bag end, and means for fastening the paper to close the bag end permanently.

5. In a device for placing covers over garments, a frame, means on said frame for delivering tubular paper therefrom, and means for supporting a garment in the path of discharge of the tubular paper so that the free end of the tubular paper may be caused to envelop the garment.

6. In a device for forming bags of the correct length for garments, a garment support, a bag fabricating support associated with said garment support, and indicating means on one of said supports for cooperating with the garment while on the garment support to indicate the proper position for the bag fabric to facilitate the fabrication of a bag of proper fit for the garment.

7. A garment bag corner folding and fastening device comprising a pair of hinged members, means for positioning foldable stock to fold along the axes of said hinged members, and stapling members carried by the hinged members and adapted to fasten the folded stock incident to operation of the hinged members to fold said stock.

8. A covering machine for garments and the like comprising a support for hangered garments to be covered, a source of supply of covering stock, means for forming a covering over the hangered garment support from the covering stock, and means providing for free removal of the covered-hangered-garment from the support.

9. In a clothes bagger, a frame; a support for a hangered garment on said frame, means on said frame for delivery of a tubular stock to envelop the supported garment, and means for forming a bag of the tubular stock over the garment.

10. In a clothes bagger, a frame; a support for a hangered garment on said frame, means on said frame for delivery of a tubular stock to envelop the supported garment, and means for forming a bag of the tubular stock over and fitting the hangered garment.

11. In a clothes bagger, a garment support, mechanism for fabricating a bag for the garment from tubular paper stock, and means adjacent the garment support for registration with the garment to indicate the length of paper stock required to fabricate a bag to fit the garment.

12. A covering machine for hangered garments and the like comprising a support for hangered garments to be covered, a source of supply of covering stock, and means for forming a covering over the hangered garment from the covering stock while on the support.

13. A cover making machine for hangered garments and the like comprising a support for hangered garments to be covered, a source of supply of covering stock, and means for forming a covering to fit the hangered garment from the covering stock while the garment is on the support.

14. A garment covering machine comprising a frame member, a support for a hangered garment on said frame member, means for covering a hangered garment on said support, said support including collapsible elements and means whereby the hangered garment can be grasped and the support collapsed to free the covered garment of the support.

15. A garment covering machine comprising a frame member, a telescoping pedestal forming a support for a hangered garment on said frame member, means for covering a hangered garment on said pedestal, and means for causing the telescoping pedestal to collapse when releasing the hangered garment therefrom so as to free the cover and the garment of the pedestal.

16. A garment cover making machine comprising, in combination, a frame, a garment support thereon, a source of tubular covering material, means providing a cover fabricating region on said frame, means for feeding covering material into said region, said fabricating region having therein means defining a line of cutting of the covering material, and indicating means on said frame arranged to show the position in the fabricating region with which the covering stock is to register in order to effect a cutting thereof to fit a garment on the garment support.

17. A garment covering machine comprising, in combination, a frame, a source of tubular covering material, means providing a cover fabricating region on said frame, means for feeding covering material into the fabricating region, means defining a line of cutting of the covering material normal to its tubular length, and means for simultaneously cutting the material in opposite directions along the line of cutting toward the edges of the covering material.

18. A garment cover making machine comprising, in combination: a frame, a source of tubular covering material, means providing a cover fabricating region on said frame, means for feeding covering material into the fabrication region, means defining a line of cutting of the covering material normal to its tubular length; and means for simultaneously cutting the material in opposite directions along the line of cutting toward the edges of the material, said cutting means including a blade carriage supporting bridge, a blade carriage movably mounted on said bridge, a cutting blade secured to the carriage, and means for moving the carriage so that the blade edge enters the covering material and progresses from a mid-region thereof toward the edges.

19. In a device for placing covers over garments, a frame, means on said frame for delivering tubular paper therefrom, means for supporting a garment in the path of discharge of the tubular paper so that the free end of the tubular paper may be caused to envelop the garment, and means between the first and the second means for cutting the tubular paper.

20. In a device for placing covers over garments, a frame, means on said frame for delivering tubular paper therefrom, means for supporting a garment in the path of discharge of the tubular paper so that the free end of the tubular paper may be caused to envelop the garment, means between the first and second recited means for cutting the tubular paper, and means on the frame whereby the tubular paper may be folded and fastened to form a bag end for the garment.

21. In a device for placing covers over garments, a frame, means on said frame for delivering tubular paper therefrom, means for supporting a garment in the path of discharge of the tubular paper so that the free end of the tubular paper may be caused to envelop the garment, said frame providing a surface over which the tubular paper is discharged with the free end of the paper in juxtaposition with the surface, means on the frame whereby to form a bag end of the tubular paper before entirely enveloping the garment, and means on the surface for indicating the amount of the tubular material required to envelop a garment comprising a series of marks for registration with the garment bottom and a corresponding series of marks with which the end of the tubular stock is registered to determine the point on the tubular material at which the bag end is to be formed in order that the bag, when enveloping the garment, just covers the garment.

22. In a device for placing covers over garments, a frame, means on said frame for delivering tubular paper therefrom, means for supporting a garment in the path of discharge of the tubular paper so that the free end of the tubular paper may be caused to envelop the garment, said device including means providing an end fabricating area including means for defining a fold line, and means for folding the tubular stock to the fold line.

23. In a device for placing covers over garments, a frame, means on said frame for delivering tubular paper therefrom, means for supporting a garment in the path of discharge of the tubular paper so that the free end of the tubular paper may be caused to envelop the garment, said device including means providing an end fabricating area terminated by a bending edge adapted to form a fold line terminus for a fold in the tubular material.

24. In a device for placing covers over garments, a frame, means on said frame for delivering tubular paper therefrom, means for supporting a garment in the path of discharge of the tubular paper so that the free end of the tubular paper may be caused to envelop the garment, and means between first and second recited means for cutting the tubular paper in opposite directions transversely from a midpoint.

25. In a device for placing covers over garments, a frame, means on said frame for delivering tubular paper therefrom, means for supporting a garment in the path of discharge of the tubular paper so that the free end of the tubular paper may be caused to envelop the garment, said frame providing an inclined surface over which the paper is discharged, and said garment support being inclined in general parallelism with the surface.

26. In a device for placing covers over garments, a frame, means on said frame for delivering tubular paper therefrom, means for supporting a garment in the path of discharge of the tubular paper so that the free end of the tubular paper may be caused to envelop the garment, said supporting means including a plurality of collapsible telescoping members, and means for releasing said members to collapse when the garment is removed from the support.

27. In a device for placing covers over garments, a frame, means on said frame for delivering tubular paper therefrom, means for supporting a garment in the path of discharge of the tubular paper so that the free end of the tubular paper may be caused to envelop the garment, said device including means providing a flat fabricating region wherein the material is folded, and a pair of flexible pivoted fingers forming the termini for fold lines for the material.

28. In a device for placing covers over garments, a frame, means on said frame for delivering tubular paper therefrom, and means for supporting a garment in the path of discharge of the tubular paper so that the free end of the tubular paper may be caused to envelop the garment, means between the first and the second means for successively cutting, folding, and fastening the tubular paper to form a bag end thereof, and foot-operated means for actuating said cutting, folding and fastening means.

29. In a device for placing covers over garments, a frame, means on said frame for delivering tubular paper therefrom, and means for supporting a garment in the path of discharge of the tubular paper so that the free end of the tubular paper may be caused to envelop the garment, means between the first and the second named means for cutting the tubular paper, folding members adjacent the cutting means adapted to fold the paper to form a closure flap, and means on said folding member adapted to staple the flap to the body of the tubular member as an incident to the folding operation.

CHARLES B. BLESSING.

REFERENCES CITED

The following references are of record in the file of this patent:

UNITED STATES PATENTS

| Number | Name | Date |
|---|---|---|
| 1,218,356 | Becker | Mar. 6, 1917 |
| 1,579,786 | Ryberg | Apr. 6, 1926 |
| 1,658,882 | Cantrell et al. | Feb. 14, 1928 |
| 1,780,142 | Becker et al. | Oct. 28, 1930 |
| 1,783,979 | Potdevin | Dec. 9, 1930 |
| 1,899,207 | Munson | Feb. 28, 1933 |
| 1,961,126 | Becker | June 5, 1934 |
| 2,016,650 | Pedersen | Oct. 8, 1935 |
| 2,103,845 | Goodstein | Dec. 28, 1937 |
| 2,130,129 | Heller | Sept. 13, 1938 |
| 2,136,703 | Miller | Nov. 15, 1938 |
| 2,145,524 | Parry | Jan. 31, 1939 |
| 2,168,962 | Schoenlaub | Aug. 8, 1939 |
| 2,172,424 | Waterman | Sept. 12, 1939 |